(12) United States Patent
Presby

(10) Patent No.: US 8,501,006 B2
(45) Date of Patent: Aug. 6, 2013

(54) APPARATUS AND METHOD FOR PROCESSING LIQUID WASTE

(75) Inventor: David W. Presby, Sugar Hill, NH (US)

(73) Assignee: Presby Patent Trust, Whitefield, NH (US)

( * ) Notice: Subject to any disclaimer, the term of this patent is extended or adjusted under 35 U.S.C. 154(b) by 68 days.

(21) Appl. No.: 13/109,695

(22) Filed: May 17, 2011

(65) Prior Publication Data

US 2011/0284477 A1  Nov. 24, 2011

Related U.S. Application Data

(60) Provisional application No. 61/367,429, filed on Jul. 25, 2010, provisional application No. 61/345,260, filed on May 17, 2010.

(51) Int. Cl.
*C02F 3/00* (2006.01)

(52) U.S. Cl.
USPC ....... 210/605; 210/609; 210/209; 210/500.21

(58) Field of Classification Search
USPC ............................. 210/605, 610, 209, 500.21
See application file for complete search history.

(56) References Cited

U.S. PATENT DOCUMENTS

| | | | |
|---|---|---|---|
| 3,160,425 A | 12/1964 | Sinnott | |
| 3,440,822 A | 4/1969 | Hegler | |
| 3,485,706 A | 12/1969 | Evans | |
| 3,559,692 A | 2/1971 | Mantelet | |
| 3,583,424 A | 6/1971 | Bryant | |
| 3,830,373 A | 8/1974 | Sixt | |
| 3,946,762 A | 3/1976 | Green | |
| 3,961,153 A | 6/1976 | Smith et al. | |
| 3,976,578 A | 8/1976 | Beane | |
| 4,015,636 A | 4/1977 | Van Fossen | |
| 4,019,326 A | 4/1977 | Herveling et al. | |
| 4,140,422 A | 2/1979 | Crumpler et al. | |
| 4,163,619 A | 8/1979 | Fales | |
| 4,182,581 A | 1/1980 | Uehara et al. | |
| 4,204,967 A | 5/1980 | Bannister | |
| 4,288,321 A | 9/1981 | Beane | |
| 4,303,104 A | 12/1981 | Hegler et al. | |
| 4,303,350 A | 12/1981 | Dix | |
| 4,413,657 A | 11/1983 | Sasaki et al. | |
| 4,523,613 A | 6/1985 | Fouss et al. | |
| 4,529,414 A | 7/1985 | Naess | |
| 4,662,778 A | 5/1987 | Dempsey | |
| 4,904,113 A | 2/1990 | Goddard et al. | |
| 4,909,665 A | 3/1990 | Caouette | |
| 4,930,936 A | 6/1990 | Hegler et al. | |
| 4,950,103 A | 8/1990 | Justice | |
| 5,002,427 A | 3/1991 | Kambe et al. | |
| 5,224,832 A | 7/1993 | Gonczy et al. | |

(Continued)

FOREIGN PATENT DOCUMENTS

| | | |
|---|---|---|
| JP | 2007-237118 | 9/2007 |
| WO | WO 2011-146470 | 11/2011 |

OTHER PUBLICATIONS

International Search Report and Written Opinion received in International Application No. PCT/US2011/036791, Date of mailing: Jan. 2, 2012, 11 pages.

*Primary Examiner* — Chester Barry
(74) *Attorney, Agent, or Firm* — Finch & Maloney PLLC

(57) ABSTRACT

A wastewater treatment system is described. The treatment system can include an aerobic digestion system, an anaerobic digestion system, and a ventilation system.

20 Claims, 22 Drawing Sheets

U.S. PATENT DOCUMENTS

| | | | |
|---|---|---|---|
| 5,263,792 A | 11/1993 | Davis et al. | |
| 5,316,047 A | 5/1994 | Kanao | |
| 5,429,752 A | 7/1995 | Presby | |
| 5,480,260 A | 1/1996 | Shattuck et al. | |
| 5,606,786 A | 3/1997 | Presby | |
| 5,716,163 A | 2/1998 | Nichols et al. | |
| 5,820,296 A | 10/1998 | Goughnour | |
| 5,954,451 A | 9/1999 | Presby | |
| 6,106,716 A | 8/2000 | Berkman | |
| 6,190,548 B1 | 2/2001 | Frick | |
| 6,290,429 B1 | 9/2001 | Presby | |
| 6,293,998 B1 | 9/2001 | Dolan et al. | |
| 6,315,493 B2 | 11/2001 | Malone et al. | |
| 6,461,078 B1 | 10/2002 | Presby | |
| 6,517,283 B2 | 2/2003 | Coffey | |
| 6,613,954 B1 | 9/2003 | Horney et al. | |
| 6,695,538 B1 | 2/2004 | Coffey | |
| 6,863,805 B1 | 3/2005 | Barreras et al. | |
| 7,144,509 B2 | 12/2006 | Boyd et al. | |
| 7,288,190 B2 | 10/2007 | Presby | |
| 7,465,390 B2 | 12/2008 | Potts | |
| 7,618,213 B2 | 11/2009 | Durkheim | |
| 7,713,414 B2 | 5/2010 | Presby | |
| 2002/0134717 A1 | 9/2002 | Jowett | |
| 2003/0113489 A1 | 6/2003 | Smith | |
| 2003/0173293 A1 | 9/2003 | Potts | |
| 2005/0269253 A1 | 12/2005 | Potts | |
| 2008/0202999 A1 | 8/2008 | Potts | |
| 2008/0271805 A1 | 11/2008 | Presby | |
| 2009/0261026 A1 | 10/2009 | Grewal et al. | |

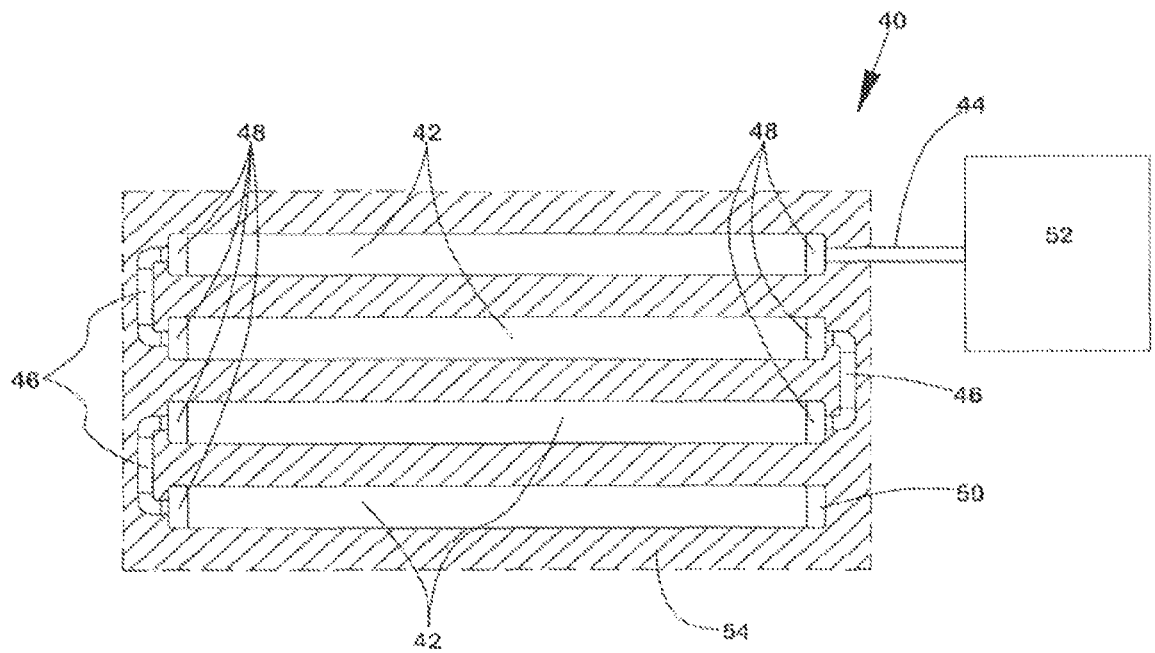
Fig. 3
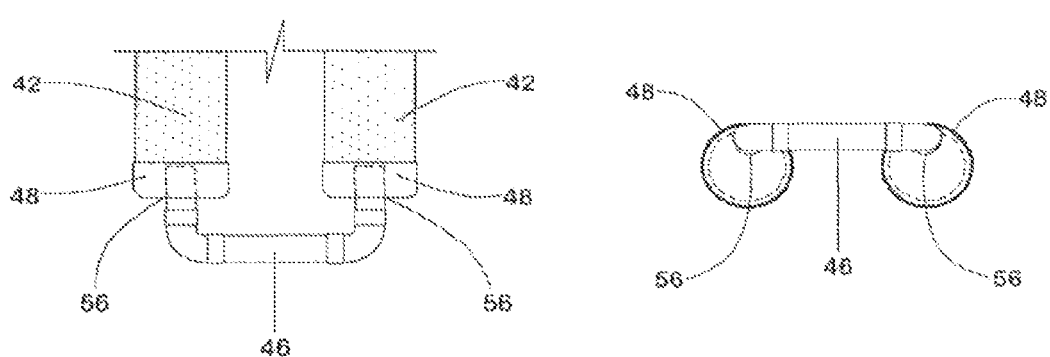
Fig. 4A
Fig. 4B

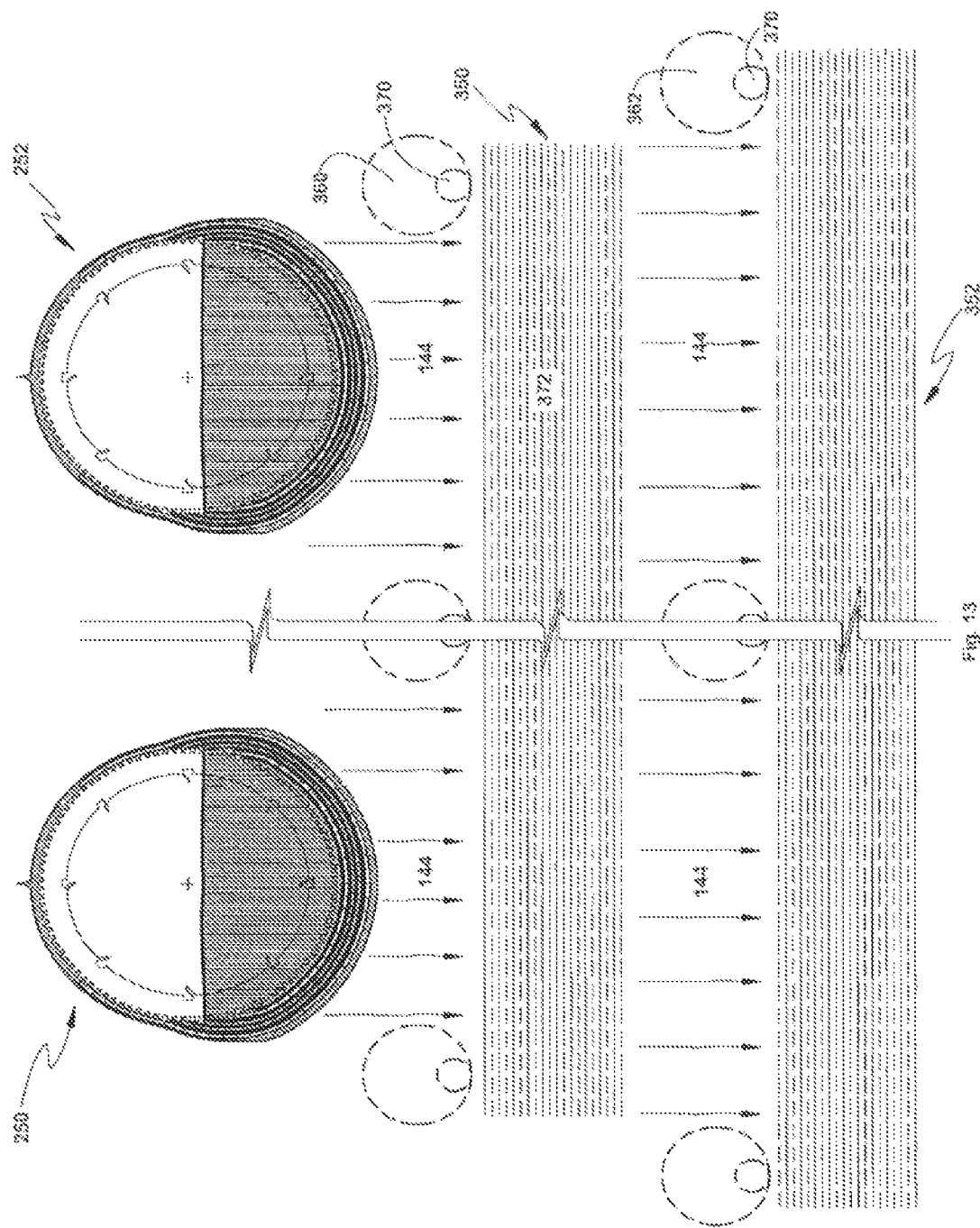

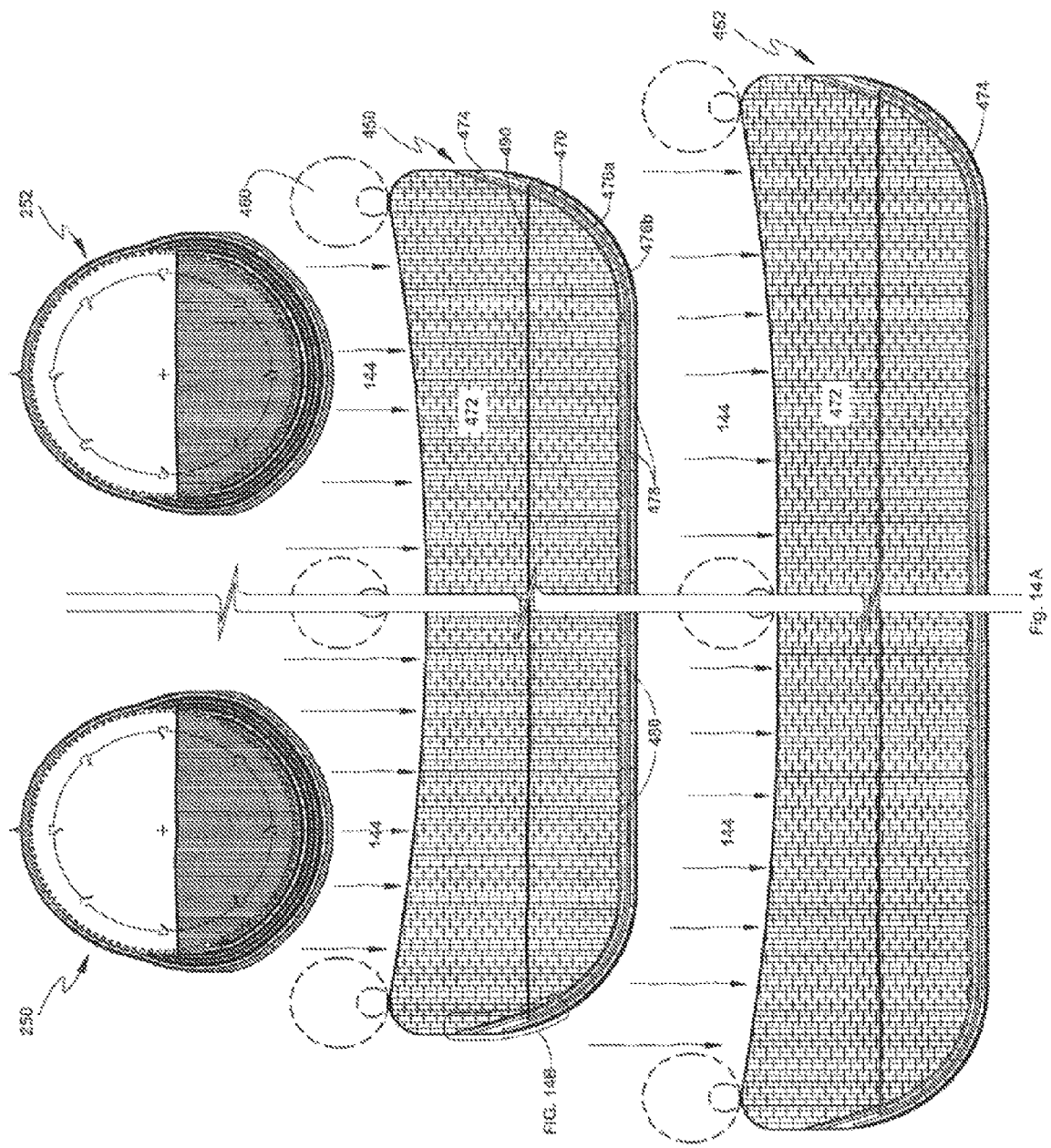

APPARATUS AND METHOD FOR PROCESSING LIQUID WASTE

CROSS REFERENCE TO RELATED APPLICATIONS

This application claims benefit of U.S. Provisional Application Ser. No. 61/367,429, filed on Jul. 25, 2010, and of U.S. Provisional Application Ser. No. 61/345,260, filed on May 17, 2010. Each patent and patent application cited herein is hereby incorporated by reference in its entirety.

BACKGROUND

1. Field of Invention

The invention relates to wastewater treatment and, in particular, to aerobic and anaerobic digestion of wastewater.

2. Discussion of Related Art

Common wastewater treatment options include aerobic digestion and anaerobic digestion. Aerobic digestion is a bacterial process that occurs in the presence of oxygen. Aerobic digestion may be used to convert, for example, TKN (Total Kjeldahl Nitrogen) and $NH_3$ into $NO_2$ and $NO_3$. Anaerobic digestion is a bacterial process that occurs in the absence of oxygen. Anaerobic digestion may be used to convert, for example, $NO_2$ and $NO_3$ into nitrogen gas and oxygen.

In a septic system, digestion of wastewater contaminants may occur by both aerobic and anaerobic digestion. For example, the conditions within a leach field of a septic system are generally aerobic. Oxygen may flow through the soil to reach the bacteria and waste in the leaching system. In other portions of the septic system, such as the septic tank, the conditions may be anaerobic. Under anaerobic conditions, the bacteria digest waste in a different manner than when oxygen is present.

SUMMARY

In one aspect, a system for treating wastewater is provided, the system comprising a conduit positioned substantially horizontally, the conduit including a plurality of apertures passing through the wall of the conduit, a semi-permeable layer contacting a lower portion of an external surface of the conduit and covering at least one of the plurality of apertures, a carbon source positioned underneath the conduit to receive liquid passing through the first semi-permeable layer, and an outer fabric layer surrounding the conduit and the carbon source.

In another aspect, a device for aerobically treating wastewater is provided, the device comprising a conduit having a wall and including a plurality of apertures passing through the wall, a first material layer wrapping a lower portion of the conduit, the first material layer having a first wrap angle measured around the circumference of the conduit, a second material layer wrapping at least a portion of the conduit, the second material layer having a wrap angle greater than 180 degrees and less than 360 degrees around the circumference of the conduit, and an outer fabric layer surrounding the conduit, the first material layer, and the second material layer.

In another aspect a device for aerobically treating wastewater is provided, the device comprising a flexible tube that is semi-permeable to water flow, a porous media contained in the flexible tube, a first material layer wrapping a lower portion of the tube, the first material layer having a first wrap angle measured around the circumference of the tube, a second material layer wrapping at least a portion of the tube, the second material layer having a wrap angle greater than 180 degrees and less than 360 degrees around the circumference of the tube and an outer fabric layer surrounding the tube, the first material layer, and the second material layer.

In another aspect, a system for aerobic and anaerobic treatment of wastewater is provided, the system comprising an aerobic module including a conduit with a wall having apertures there through and at least one semi-permeable layer wrapping a lower portion of the conduit an anaerobic module including a carbon source isolated below the semi-permeable layer, and at least one vent constructed and arranged to direct gases produced within the carbon source around the conduit.

In another aspect, a method of treating wastewater is provided, the method comprising flowing the wastewater through the interior of a conduit having a wall including apertures there through, passing the wastewater through a layer at least partially covering the external surface of the conduit, converting ammonia and/or TKN in the wastewater to $NO_x$, passing the wastewater to a carbon source, converting at least a portion of the $NO_x$ to nitrogen gas within the carbon source, and directing the nitrogen gas away from the conduit.

In another aspect, a method of treating wastewater in a wastewater treatment system is provided, the method comprising flowing the wastewater through the interior of a conduit having a wall including apertures there through, passing the wastewater through a semi-permeable layer at least partially covering the external surface of the conduit, converting ammonia and/or TKN in the wastewater to $NO_x$; passing the wastewater to a carbon source, converting at least a portion of the $NO_x$ to nitrogen gas within the carbon source, and intermittently providing oxygen to the system to reduce the number of pathogens present in the system.

The systems, devices and methods described herein may be used separately or together, and components or techniques described in relation to one system or method are capable of being implemented with the others. The subject matter of this application may involve, in some cases, interrelated products, alternative solutions to a particular problem, and/or a plurality of different uses of a single system or article.

BRIEF DESCRIPTION OF THE DRAWINGS

FIG. 3 is a top view of one embodiment of an aerobic digestion system connected to a septic tank.

FIG. 4A is a top view of one embodiment of an aerobic digestion system having conduits connected with connecting pipes.

FIG. 4B is an end view of one embodiment of an aerobic digestion system having conduits connected with connecting pipes.

FIG. 13 is a cross-sectional view of one embodiment of a wastewater treatment system including two aerobic modules and two anaerobic modules;

FIG. 14A is a cross-sectional view of another embodiment of a wastewater treatment system including two aerobic modules and two anaerobic modules;

DETAILED DESCRIPTION

Figure 1:
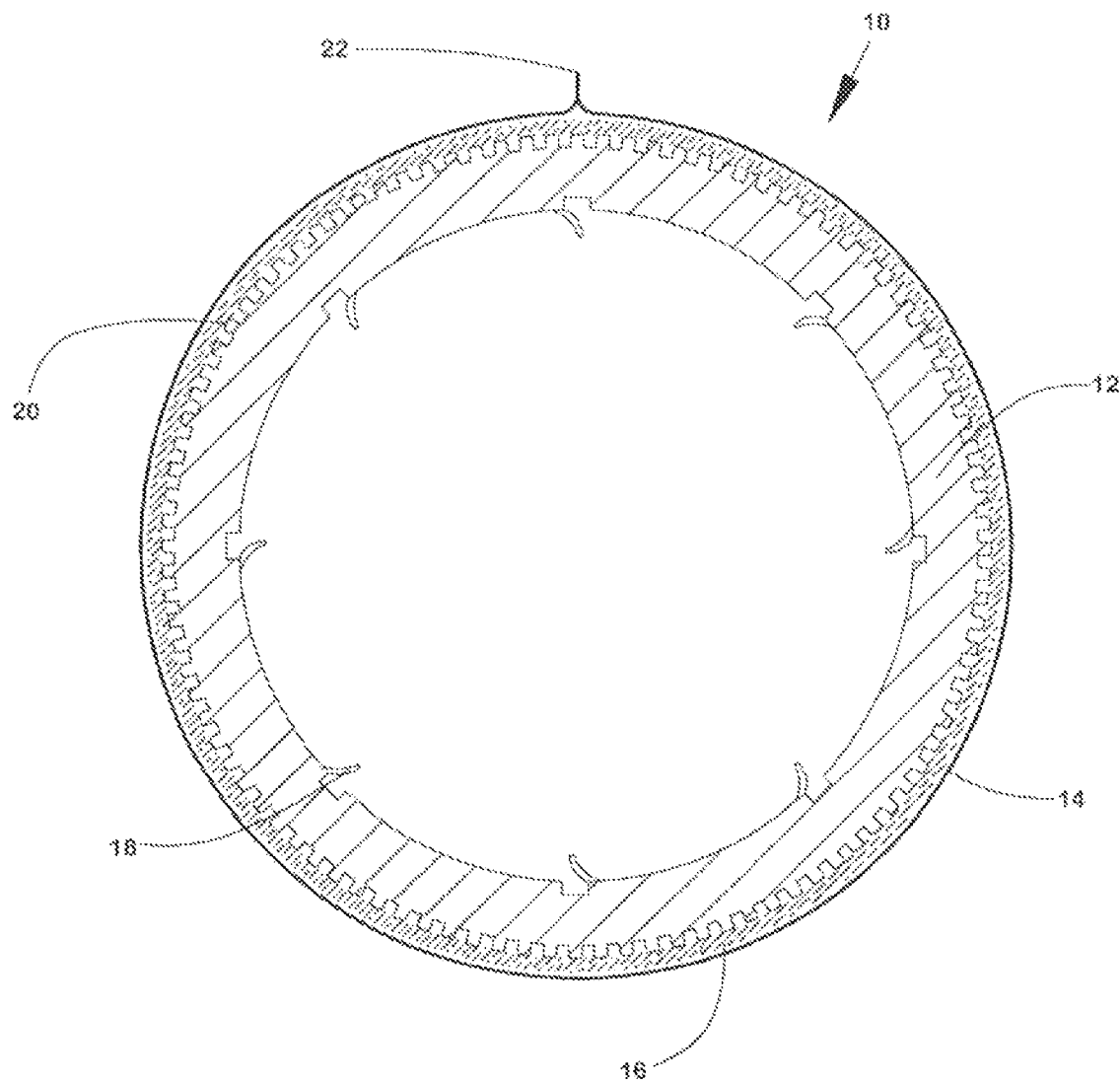
FIG. 1 is a cross-sectional view of one embodiment of an aerobic digestion system.

U.S. Pat. Nos. 6,290,429 and 7,288,190 discuss aerobic and anaerobic systems and are hereby incorporated by reference in their entireties herein.

In one aspect, an aerobic treatment system is provided for aerobically digesting wastewater, such as septic tank effluent. Wastewater can be any source of water that can be improved by aerobic treatment, anaerobic treatment or a combination of aerobic and anaerobic treatment. Wastewater includes, for example, septic tank effluent, industrial effluent, storm water and contaminated ground water. The aerobic treatment system may include a module such as a perforated conduit and one or more layers of material, such as fabric, wrapped around at least a portion of the conduit. Alternatively, the aerobic treatment system may include a flexible tube filled or partially filled with a solid material that exhibits enough porosity to allow the passage of wastewater. Wastewater may be delivered to the conduit from a waste source, such as a septic tank. Once inside the conduit, the wastewater may flow through the perforations in the conduit and into the layer of material. Conditions within the fabric and/or conduit may be aerobic, either passively or through the addition of oxygen to the system. Bacteria present in the conduit and material may aerobically digest at least a portion of the contaminants present in the wastewater. For example, organic compounds may be digested into carbon dioxide while nitrogen compounds, such as TKN and $NH_3$, may be converted into $NO_2$ and $NO_3$ ($NO_x$). After the wastewater has been treated by the aerobic system, it may flow out of the system and into the surrounding soil, which may be permeable.

In another aspect, an anaerobic system is provided for anaerobically digesting wastewater, such as septic tank effluent. In one embodiment, the anaerobic system is a module that includes a carbon source. By combining the wastewater with the carbon source, anaerobic conditions may be created and compounds such as $NO_2$ and $NO_3$ may be reduced to produce nitrogen gas. The anaerobic system may also include one or more layers supporting the carbon source. The one or more layers may be an impervious or porous material such as a fabric. For example, wastewater may flow through the carbon source until it reaches a layer of semi-permeable fabric. The fabric may include perforations that allow the wastewater to reach additional layers of fabric where additional anaerobic digestion may occur. The fabric layers can retain the effluent so that it remains in contact with the carbon source, providing adequate residence time to convert more than 50%, more than 70%, more than 80% or more than 90% of the $NO_x$ to nitrogen gas. Aerobic and anaerobic systems may be alternated in series to provide different waste water treatment paths. For example, systems may be configured to provide aerobic/anaerobic or aerobic/anaerobic/aerobic treatment. Additional anaerobic modules may be added and may be placed below or next to the existing anaerobic modules. The additional anaerobic modules may be in contact with the first module or may be spaced from the first module.

In another aspect, a treatment system is provided that includes both an aerobic system and an anaerobic system. In one set of embodiments, the treatment system begins treating waste in the aerobic system, which may include, for example, perforated conduit wrapped in one or more layers of semi-permeable material. After leaving the aerobic system, the wastewater may flow into the anaerobic system, which may include a carbon source and/or one or more additional layers of material for retaining water in contact with the carbon source. In another embodiment, a treatment system may include, for example, a retainer surrounding both the aerobic system and the anaerobic system. This retainer can ease installation of the combined aerobic/anaerobic system and can facilitate shipping. The retainer may be flexible and can be, for example, a durable fabric that may be permeable or semi-permeable so that treated water can pass through the fabric into the surrounding soil. It may also be permeable to oxygen. A permeable material may be placed between the aerobic system and the anaerobic system to facilitate the flow of wastewater between the two systems. The aerobic system may be placed above the anaerobic system so that the wastewater can flow by gravity from the aerobic system to the anaerobic system. A composite hybrid system constrained by the retainer may ease shipping and installation problems by providing the system installer with a complete aerobic/anaerobic system that is ready to place in situ. The spacing and orientation of the aerobic and anaerobic components in relation to each other may be pre-set so that, for example, the components can be spaced for optimum performance. In addition, the occurrence of installation errors may be minimized as fewer steps are required to install the system.

In another aspect, a treatment system may include a ventilation component. It has been found that gases from an anaerobic module can adversely affect an aerobic module that is positioned nearby. Specifically, it is believed that nitrogen gas from the anaerobic module can enter the aerobic module and interfere with aerobic bioactivity, resulting in a decrease in aerobic treatment levels. A ventilation system can divert the nitrogen from the aerobic module and eliminate the interference caused by the nitrogen gas. In one embodiment, the ventilation component may include a gas conduit such as one or more perforated pipes fluidly in communication with one or more exterior pipes. In one embodiment, a gas generated in the anaerobic module, such as nitrogen or carbon dioxide, may enter the perforated pipe and flow through the perforated pipe into an exterior pipe. The exterior pipe may then discharge the gas to the atmosphere. The perforated pipe may be placed within and/or adjacent to an anaerobic system. For example, a vent may be inserted into, or placed adjacent to, a carbon source within an anaerobic module. The vent may run along a portion or the entire length of the anaerobic module. In one embodiment, a perforated pipe is placed above the carbon source to intercept and redirect nitrogen gas before it contacts the aerobic system above. One or more vents may be positioned between the anaerobic system and an aerobic system. For example, a perforated pipe may be placed above the carbon source of the anaerobic system and below the aerobic system. Air or another fluid may flow through the pipe either passively or actively to aid in removing nitrogen gas from the system.

The systems provided herein may be used to treat wastewater of any kind, including, for example, residential septic tank effluent, commercial septic tank effluent, industrial effluent, storm water, wastewater having high bacterial oxygen demand, wastewater having high chemical oxygen demand, wastewater having high suspended solids concentrations, wastewater contaminated with oil, and/or wastewater contaminated with chemicals.

The systems provided may be used to treat any type of organic and/or inorganic material within the wastewater. The organic compounds may include, for example, carbohydrates, cellulose, sugars, fats, hydrocarbons, oil, grease, proteins and organic nitrogen such as proteins, amino acids, urea and uric acid. The treated waste stream may also include inorganic materials such as metals and ionic compounds including phosphates, sulfates and carboxylates.

In another embodiment, the systems provided may be used to remove different forms of nitrogen from the wastewater. For example, ammonification may occur where bacteria convert organic nitrogen into ammonia ($NH_3$). Also, nitrification may occur, under aerobic conditions, where bacteria oxidize $NH_3$ into nitrite ($NO_2$) and subsequently into nitrate ($NO_3$). Finally, denitrification may occur, for example, under anaerobic conditions, where bacteria reduce $NO_x$ to nitrogen gas which can optionally be vented from the system.

The conduit used in the aerobic system may have any cross-sectional shape and size, and may be made of any solid material. For example, the conduit may be circular in cross-section and may have a diameter between about 15 cm and 45 cm. In one set of embodiments, the diameter is about 30 cm. The conduit may be provided in specific lengths that may be joined by connectors. For example, a conduit may be about 10 feet (3 meters) long. In addition, the conduit may be made of plastic, such as polypropylene or polyethylene. Perforations in the conduit may have any shape, such as circular and/or rectangular, and the perforations may have any functional size, for instance, of between about 1 mm and 20 mm. For example, the perforations may be round and have a diameter of about 10 mm. The conduit may also be corrugated. For example, the inner diameter and/or outer diameter of the conduit may vary sinusoidally along the axial length of the conduit. A suitable perforated conduit is ENVIROSEPTIC® pipe available from Presby Environmental, Inc., Whitefield, N.H.

In another aspect, the aerobic module need not include a hollow pipe but instead may be a tubular or substantially tubular conduit that contains porous media that provides enough porosity to allow for adequate water flow through the media. The media may be retained in a rigid or flexible covering and may be a solid unitary material or an aggregate of many pieces of similar material. The media retainer may be a rigid pipe, an impermeable flexible fabric, a semi-permeable flexible fabric, a permeable fabric or a coating or adhesive that is applied to the media. The media retainer can keep the aggregate together and can help to maintain a consistent pore size in the media. The media retainer may form a flexible, malleable tube that serves to contain the media but need not be rigid enough to support the media by itself as the weight of the media can be supported by sand, soil, gravel or other material that surrounds the module when it is in the ground. The porous media may allow for the passage of wastewater and can provide additional surface area upon which bacterial colonies can grow. The porous media may be partially surrounded by layers of semi-permeable fabric and mesh as described for other embodiments herein.

The porous media can be compatible with microbial growth and may be, for example, natural or synthetic packed aggregate. Natural aggregates include, for example, crushed stone, sand, vermiculite and shells. Synthetic aggregates include, for example, glass, polymeric beads, ceramic, expanded polymers such as styrofoam (packing peanuts), crushed concrete, and crushed cement. The individual aggregate pieces may be of consistent or varying sizes and size may be chosen to optimize, for example, water flow, bacterial activity and/or moisture retention. Aggregate pieces may be coated with substances, for example, to increase surface area, increase porosity, increase or reduce surface tension or improve microbial growth. The aggregate may be retained in a flexible fabric and thus may conform to the surroundings rather than retain a rigid shape as in the case of plastic pipe. The fabric may be filled with aggregate on site to avoid the need for transportation of the completed module. In some cases, the aggregate may be placed into the retainer in situ.

Additional types of porous materials include, for example, unitary blocks of porous material such as porous concrete, expanded or sintered polymers or sintered glass. These materials should have enough pore structure that an adequate flow of water can pass through the material to prevent backup while providing an appropriate dwell time for microbial activity. These unitary media can be molded into module sized pieces and can then be coated with an impermeable material such as a sealant to retain water within the media. For example, an expanded porous foam block may be coated with a semi-permeable polyurethane coating.

The carbon source used in the anaerobic system may be any material that contains carbon. It may be permanent or renewable and may be a solid, a gel, a suspension, a liquid, or some combination thereof. The carbon source can be a porous material allowing for long term continuous contact with liquid effluent. The carbon source may include cellulose. For example, the carbon source may be any one or combination of carbohydrates, wood, wood chips, sawdust, leaves, wood shavings, grass, hay, mulch, straw, composting materials, fiberboard, pressed board, cardboard, newspaper, and charcoal. The carbon source can be in a variety of shapes including a liquid solution, a solid block, an aggregate of particles or a spiral wound sheet. In some embodiments, sulfur may be added to the carbon source to promote anaerobic activity. Sulfur may be in the form of a solute such as sulfates or sulfites.

A permeable material may be placed between the aerobic and anaerobic modules. The permeable material can facilitate the flow of wastewater from the aerobic system to the anaerobic system may be any type of porous drainage material. For example, the permeable material may be any one or combination of sand, broken glass, plastic fibers, ground-up plastic, gravel, slag, shredded rubber, polymeric beads and ash.

Both the aerobic system and the anaerobic system may utilize different types of layers. Layers may include fabrics, aggregates and solids. Fabrics may be, for example, woven, non-woven, extruded, natural, synthetic or mixtures thereof. Aggregates can include, for example, sand, gravel, soil, glass beads, polymeric beads and other non-reactive particles. Solids may include, for example, monoliths such as carbon blocks, cardboard, polymeric blocks and inorganic blocks. One or more layers may be permeable, semi-permeable or impermeable to water. As used herein, a "permeable" material allows water to pass freely through the material with minimal or no retention. Permeable materials may be porous and may be of organic or inorganic materials. Examples of permeable materials include sand, fiberglass, glass beads, some woven and non-woven fabrics, such as layers of randomly distributed polymeric fibers and polymer mesh. Organic materials such as cotton, wool or hair may also be used to form a permeable layer. Permeable materials may include pores that allow for the free flow of water and/or other liquids while preventing the passage of some solids. Permeable layers may serve as supports for devices while allowing the passage of water there through. Permeable layers may also support microbial growth.

A "semi-permeable" material allows water to pass through the material after a period of retention. Water may pass through a semi-permeable material but most solids are retained. The period of liquid retention can allow for substantial wetting and microbial growth on the semi-permeable material. Such retention may also be useful for raising effluent to levels where it can be transferred to a subsequent conduit. The semi-permeable material may be hydrophilic or hydrophobic. For instance, a semi-permeable material may be a hydrophilic geotextile fabric that has been needle-punched with a plurality of holes to allow the controlled passage of water. The diameter of these holes may be, for example, less than 1 mm, less than 0.5 mm or less than 0.1 mm. Semi-permeable materials may also include fabric layers of woven organic and/or polymeric fibers that provide for the controlled passage of liquids such as water. Examples include layers of polyethylene and polyester fabrics that may be extruded or produced from fibers.

An "impermeable" material prevents the flow of water (and other liquids) through the fabric and is designed to retain water indefinitely. Impermeable materials include extruded and non-extruded polymers and polymeric fabrics that have not been breached, such as by punching. Polyethylene, polypropylene and ABS are examples of impermeable materials that can be used to form impermeable layers. Other types of impermeable layers include concrete, glass, metals, alloys, molded plastics, non-woven polymeric fabrics and woven polymeric fabrics.

Each material, and in particular the semi-permeable materials, may exhibit an "acceptance rate." The acceptance rate is the rate at which effluent passes through the layer in situ under the force of gravity only. Thus, materials having higher acceptance rates are typically of higher porosities. Materials of differing acceptance rates can be used in the same device. A "long term acceptance rate" is the acceptance rate of a material after the system has been brought up to operating condition, that is, it includes an active bacterial layer in and/or on the material. The semi-permeable material layers may have, for example, a long-term acceptance rate of between about 1 and 20 gal/ft$^2$/day, about 2 to 15 gal/ft$^2$/day or about 3 to 10 gal/ft$^2$/day. The long-term acceptance rate of a layer of material may change over time. For instance, the rate may decrease as additional microbial layers are formed on the material or as the number or size of pores is reduced by the accumulation of solid materials. Additional semi-permeable layers can reduce the overall acceptance rate of the system.

The long-term acceptance rate of a material may depend on the structure of the material and/or the composition of the material. In one embodiment, a lower long-term acceptance rate may be achieved by using a fabric material that is denser, thicker, and/or less porous than other materials. A lower long-term acceptance rate may also be achieved by using fabrics made of specific materials. For example, the long-term acceptance rate of water through a fabric layer may be reduced by using fabric materials that are hydrophobic. In addition, the long term acceptance rate may be reduced through the use of additives. For example, one or more additives may be introduced into a fabric material to make the surface more hydrophobic and/or to at least partially reduce the pore size within the fabric layer. Different materials may also be added to render the pores more tortuous, resulting in a lower acceptance rate. Fabric layers may be designed that have different acceptance rates in different portions of the fabric. For example, a fabric can be designed so that it provides longer retention of water in a lower section of the conduit while providing less retention in upper portions (in cross section) of the conduit. An impermeable fabric may be rendered semi-permeable by punching holes in all or a portion of the fabric. A fabric layer may be selectively punched so that it is semi-permeable in one portion and impermeable in another. For instance, a central portion of the layer may be unpunched in order to retain water while peripheral portions of the fabric may be punched to allow fluid flow through the layer.

One or more layers in the aerobic system and/or the anaerobic system may be a porous spacer layer. The spacer layer may be used to promote the flow of water and to provide space between adjacent bioactive layers. The materials used for the spacer layer may be natural or synthetic and can include polymeric, metallic or glass-based materials, for example. Polymeric spacers can be formed from woven or non-woven materials and can be in the form of random fibers, such as a fiber mat. Alternatively, the layer may include a mesh with channels. The fibers and/or mesh may be made of solid materials, including rubber and plastics such as polyethylene, polypropylene or polyester. Porous spacer layers may have a thickness, for example, between about 0.1 mm and 5 mm. For instance, the thickness may be about 2 mm. The spacer layer should be able to retain its thickness when an additional layer is wrapped around it.

The systems described herein may be used to treat wastewater having temperatures ranging from about −5 to 100 degrees C. In one embodiment, the temperature of the wastewater may be between about zero and 40 degrees C. Wastewater pH can vary and may be in a range to promote biological activity. In some cases the water being treated may have a pH ranging from about 4 to 10, 6 to 8, or 6.5 to 7.5.

FIG. 1 illustrates one embodiment of an aerobic system 10 that includes a perforated conduit 12, a layer of spacer fabric 14, and a layer of semi-permeable fabric 16. Perforated conduit 12 includes skimmers 18 and external ridges 20. Skimmers 18 may prevent grease and suspended solids from leaving perforated conduit 12. Spacer fabric 14 is wrapped around the outer circumference of perforated conduit 12. Semi-permeable fabric 16 is wrapped around spacer fabric 14 and attached at a seam 22 by, for example, sewing, stapling, ultrasonic welding, heat bonding and/or gluing. Wastewater may be flowed axially along the interior of the conduit and may be treated by passing radially through one or more layers of fabric.

Figure 2:
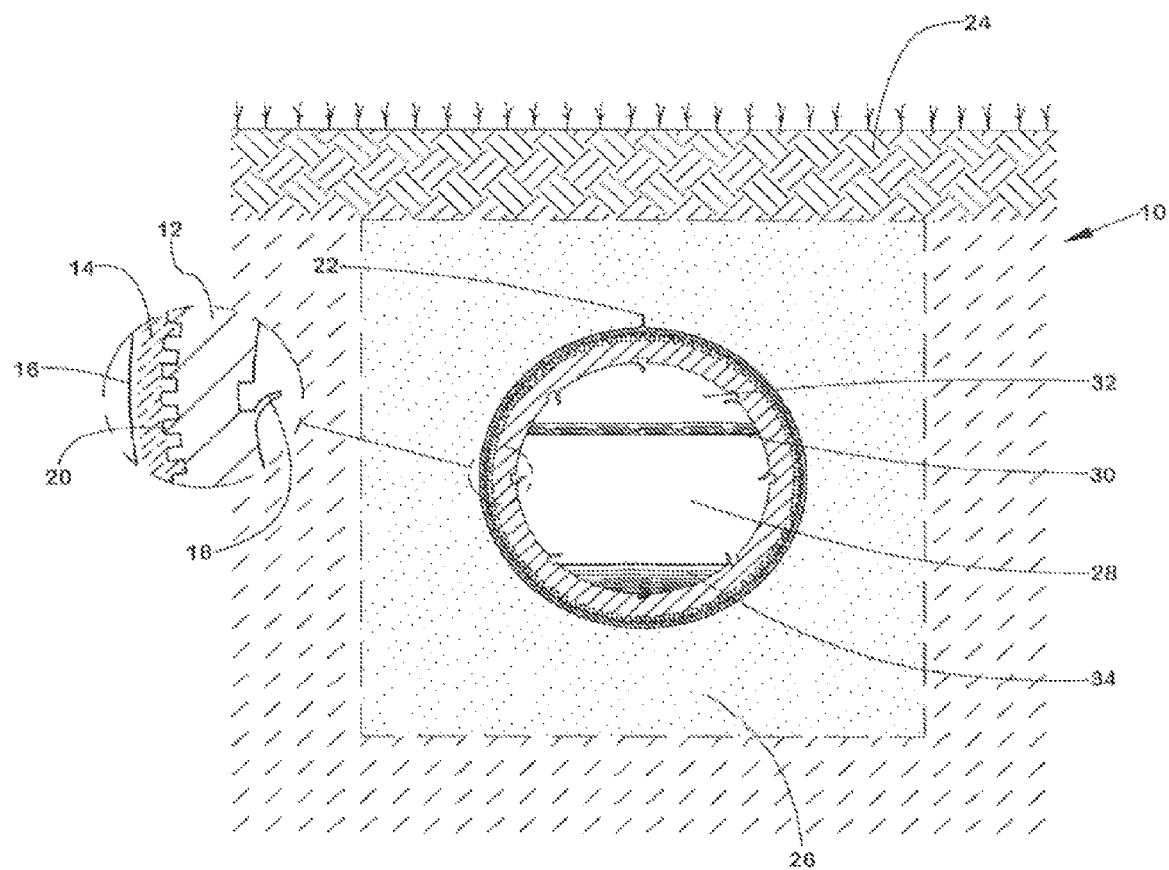
FIG. 2 is a cross-sectional view of one embodiment of an aerobic digestion system installed in the ground.

FIG. 2 shows aerobic system 10 buried underneath top soil 24 and surrounded by permeable material 26. As shown, perforated conduit 12 may be partially filled with wastewater 28. The surface of wastewater 28 may be covered with a scum 30. Above wastewater 28 may be an air space 32. A sludge 34 may accumulate at the bottom of conduit 12.

FIG. 3 provides a plan view of an aerobic system 40 having a series of modules comprising perforated conduits 42, a feed pipe 44, connecting pipes 46, adapters 48, and an end cap 50. Feed pipe 44 connects aerobic system 40 to a septic tank 52. During operation of aerobic system 40, wastewater flows from septic tank 52 through feed pipe 44 and into perforated conduits 42. Adapter 48 connects feed pipe 44 to perforated conduit 42. Additional adapters 48 connect connecting pipes 46 to perforated conduits 42. End cap 50 prevents wastewater from flowing out of the end of the series of conduits 42. Conduits 42 are surrounded by a permeable material 54 such as sand. The system may optionally include a distribution box (not shown) positioned between the septic tank and the aerobic system. The system may be gravity fed and conduits 42 may be canted with reference to horizontal so that water flows from one conduit to the next. Thus, the conduits farther from septic tank 52 may be slightly downhill from those that are closer to septic tank 52. In some embodiments, wastewater may be pumped through the system.

While the embodiment shown in FIG. 3 shows conduits 42 arranged in series, conduits 42 may also be arranged in parallel or in different combinations of series and parallel. For example, a parallel configuration may be obtained by delivering wastewater from septic tank 52 directly into each of conduits 42. As an additional example, two of conduits 42 could receive wastewater directly from septic tank 52 and one or both of these two conduits 42 could then deliver wastewater to one or more additional conduits 42 located further downstream.

FIGS. 4A and 4B show a top view and an end view, respectively, of perforated conduit 42, connecting pipes 46, and adapters 48. Adapters 48 have openings 56 to receive connecting pipes 46. As shown, openings 56 may be offset radially from the center of adapters 48. The position of openings 56 within adapters 48 may be selected to achieve the desired liquid level at which wastewater begins to flow through connecting pipes 46 between conduits 42.

Figure 5:
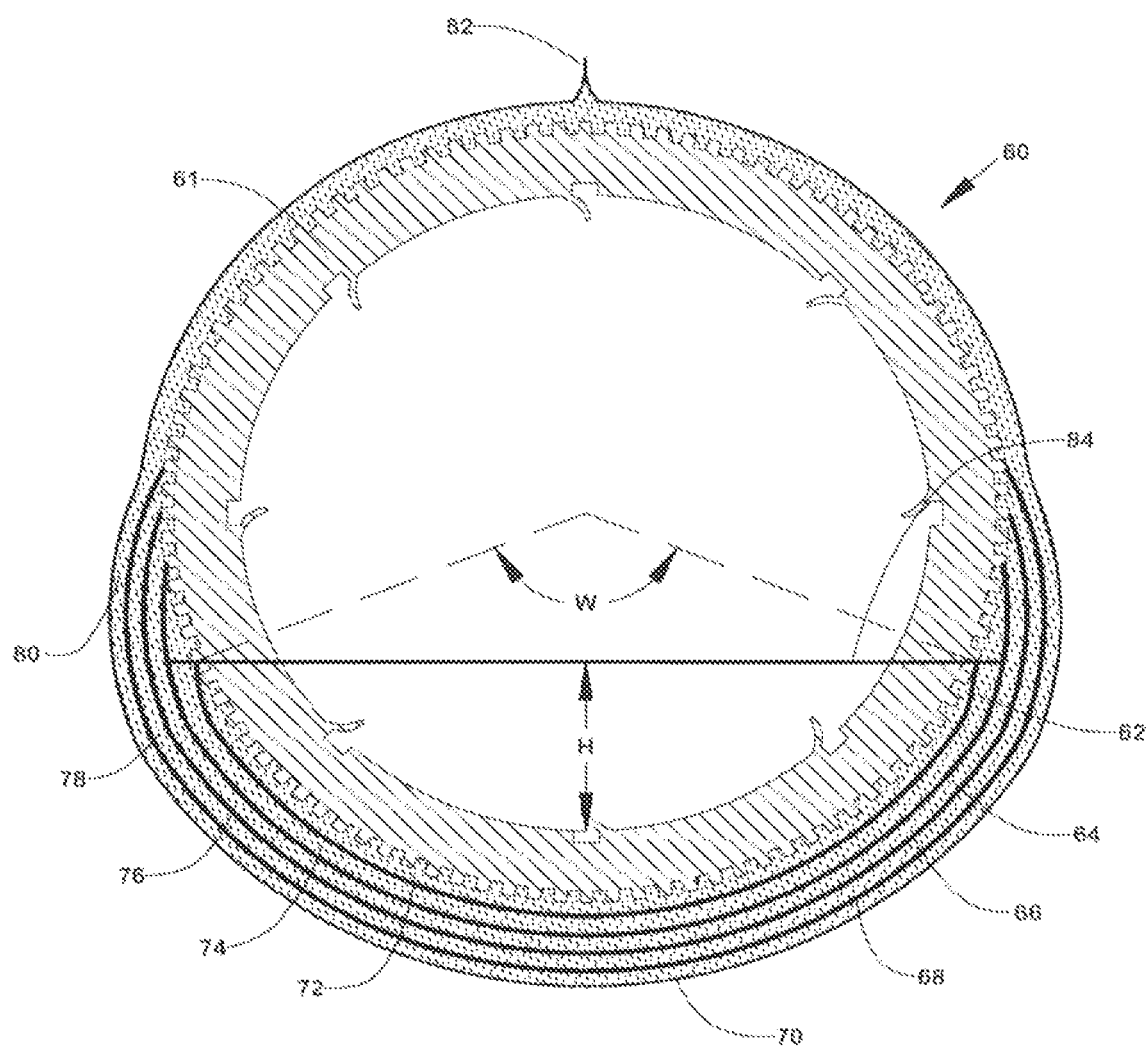
FIG. 5 is a cross-sectional view of one embodiment of an aerobic digestion system partially-filled with wastewater.

FIG. 5 provides a cross-sectional view of aerobic module 60 having a perforated conduit 61, semi-permeable layers 62, 64, 66, 68, an outer layer 70 encompassing the conduit, and permeable spacer layers 72, 74, 76, 78, 80. As shown, the semi-permeable layers are fabric layers comprising needle-punched geotextile fabric. Other semi-permeable layers may be employed. Semi-permeable layers 62, 64, 66, 68 may be wrapped around a lower portion of the outer surface of conduit 61. Spacer layers 72, 74, 76, 78, 80 may be positioned adjacent to each side of semi-permeable layers 62, 64, 66, 68 and may provide a proper spacing and flow region between conduit 61, semi-permeable layers 62, 64, 66, 68, and outer fabric 70.

Figure 6:
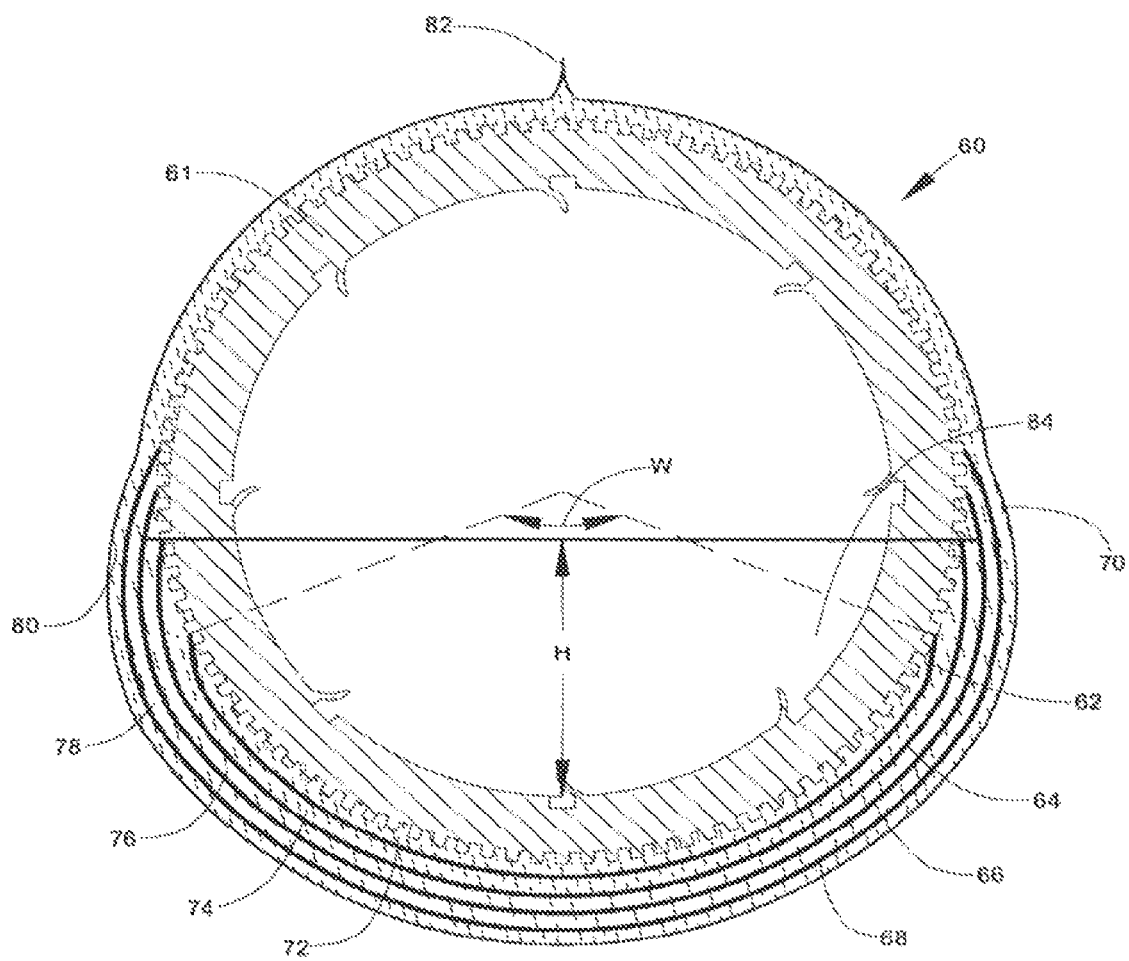
FIG. 6 is a cross-sectional view of one embodiment of an aerobic digestion system partially-filled with wastewater.

The term "wrap angle" is used herein to describe the amount of conduit that is covered by a particle layer. As shown in FIG. 6, the wrap angle W is the angle around conduit 61 that is wrapped by a layer, such as semi-permeable layer 62. For example, a material that completely encircled the perimeter of the conduit, such as outer fabric layer 70, would have a wrap angle of 360°. Semi-permeable layers 62, 64, 66, 68 and spacer layers 72, 74, 76, 78, 80 may have different wrap angles. As shown, among semi-permeable layers 62, 64, 66, 68, wrap angle W for layer 62 may be smaller than the wrap angles for fabric layers 64, 66, 68. In one set of embodiments, the wrap angle may increase or decrease monotonically from innermost semi-permeable layer 62 to outermost semi-permeable layer 68.

Outer fabric 70 may be wrapped around semi-permeable layers 62, 64, 66, 68, spacer layers 72, 74, 76, 78, 80, and conduit 61. Outer fabric 70 may be permeable, semi-permeable or impermeable and different outer fabrics may be used at different points throughout the system. Outer fabric 70 can be attached at a seam 82 by, for example, sewing, stapling, ultrasonic welding, heat bonding and/or gluing. Outer fabric 70 can help to retain other layers in position and may be permeable to permit the flow of liquids through outer fabric 70 and away from aerobic module 60.

During operation of aerobic module 60, the height of the wastewater inside conduit 61 depends on the flow rate of wastewater into conduit 61 and the flow rate of wastewater out of conduit 61. The flow rate out of conduit 61 is the sum of the flow through the treatment layers (radial flow) and the amount of flow being passed to the next conduit in the series (axial flow). As the flow rate into conduit 61 increases, the liquid height may increase until the flow rate out of conduit 61 becomes equal to the flow rate into conduit 61. The flow rate out of conduit 61 may depend on the long-term acceptance rates of the various fabric layers. The greater the long-term acceptance rates, the more easily liquid can exit conduit 61 by treatment through layers 62, 64, 66, 68, 70, 72, 74, 76, 78, 80.

FIGS. 5 and 6 show different wastewater heights within conduit 61. In FIG. 5, the wastewater has reached a height H where the radial flow rate out of conduit 61 is equal to the "composite flow rate" of fabric layers 62, 64, 66 and 68. If the flow rate into conduit 61 is further increased, the wastewater height may increase, causing wastewater to spill over the top edges of innermost semi-permeable fabric layer 62 and into the region occupied by spacer layer 74. Similarly, in FIG. 6, the wastewater has reached a height H' where the radial flow rate out of conduit 61 is equal to the composite flow rate of layers 64, 66 and 68. This has effectively eliminated the contribution to flow rate reduction that is provided by layer 62 at lower wastewater levels. Further increases in the flow rate into conduit 61 may cause wastewater to spill over the edges of semi-permeable fabric layer 64 and into the region occupied by spacer layer 76. As the upper edge of each successive semi-permeable (of increasing wrap angles) layer is breached, the radial flow rate increases as the effluent passes through fewer layers, thus providing for reduced flow resistance. It is to be understood that under these conditions there still exists radial flow through layer 62 but that water flowing above the upper edge of layer 62 is not retained by layer 62 and can pass directly to the next layer. Additional increases in the flow rate into conduit 61 may cause the liquid height to rise until wastewater eventually spills over the edges of semi-permeable fabric layer 66 and/or semi-permeable fabric layer 68. The composite flow rate (and thus the long-term acceptance rate) increases as the water level rises, providing greater treatment capacity at higher effluent levels.

Figure 7:
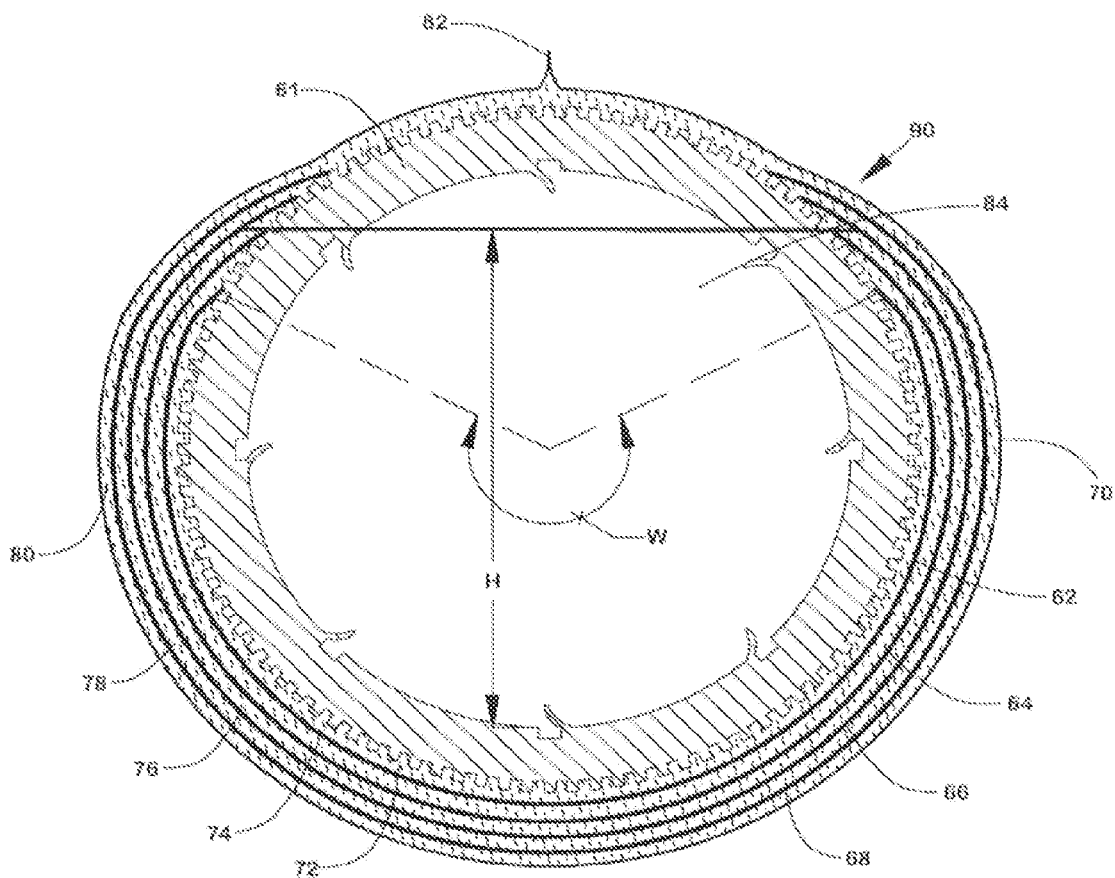
FIG. 7 is a cross-sectional view of one embodiment of an aerobic digestion system having a conduit wrapped in fabric with large wrap angles.

FIG. 7 shows an embodiment of an aerobic module 90 having a greater acceptance rate and increased radial flow with the same number of layers as shown in module 60 of FIG. 6. Module 90 includes semi-permeable layers (fabric) 62', 64', 66', 68' and permeable spacer layers 72', 74', 76', 78', 80' that allow the liquid height to be increased beyond that achievable with aerobic module 60. The greater liquid height may be achieved by, for example, decreasing the long-term acceptance rate of the conduit. This can be achieved by, for example, decreasing the long term acceptance rate of one or more fabric layers 62', 64', 66', 68', such as by reducing the porosity of these layers, using a denser fabric or increasing the concentration of microbes on the fabric. In addition, higher wrap angles in aerobic module 90 allow wastewater to reach a greater height before it can spill over fabric layers 62', 64', 66', 68'. For example, fabric layer 62' has a wrap angle W' that may be greater than wrap angle W of fabric layer 62. This can provide for a greater surface area available for treatment and greater overall radial flow even though the radial flow per square area of material may not change or may even decrease. Height H" at which wastewater may spill over fabric layer 64' may be greater than height H' at which wastewater may spill over fabric layer 64. The greater liquid height achievable with aerobic module 90 may result in greater contact between the wastewater and the fabric layers, and this may allow aerobic module 90 to process a larger input flow rate of wastewater and/or treat a greater volume of effluent. The additional head pressure obtained may also increase flow through the lower portion of the layers.

In order to achieve the greater liquid height in aerobic module 90, the location of openings 56 in adapters 48 may be raised. See FIG. 4B. These openings 56 permit wastewater to exit conduit 61 and, if openings 56 are too low, wastewater may exit conduit 61 before the wastewater can reach the desired height. Thus, in one embodiment, aerobic module 90 may include adapters 48 having openings 56 located near the top of adapters 56. These openings can be, for example, off center and can be less than 4 inches, less than 3 inches or less than two inches from the outer wall of the conduit.

Figure 8A:
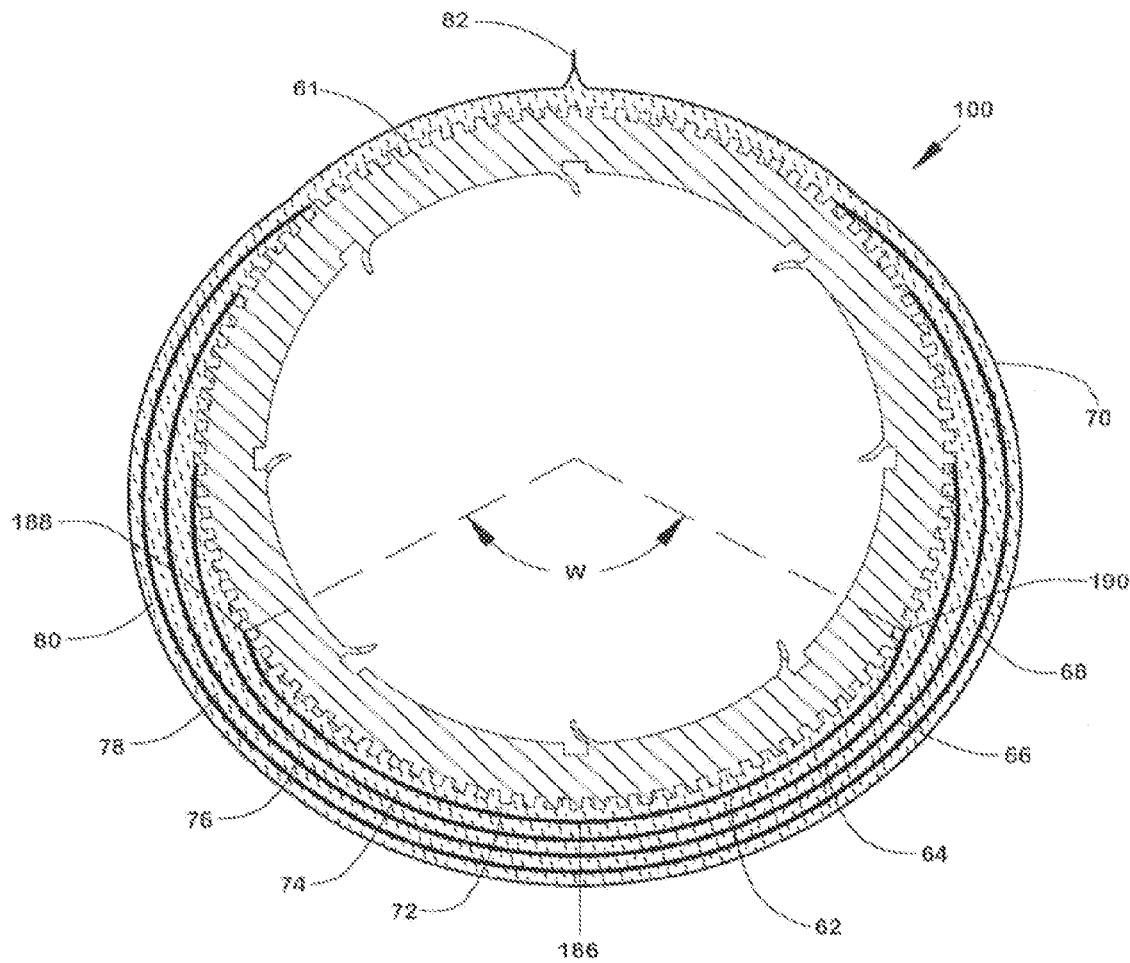
FIG. 8A is a cross-sectional view of one embodiment of an aerobic digestion system having a conduit wrapped in fabric having large and small wrap angles.

FIG. 8A illustrates an embodiment of an aerobic module 100 having a perforated conduit 61, a dense fabric layer 62", and additional less dense fabric layers 64", 66", 68". Successive layers may be of different densities resulting in different individual acceptance rates. The layers may also have properties other than density that can be used to alter the flow through the layer. Adjacent to dense fabric layer 62" and additional fabric layers 64", 66", 68" are spacer layers 72", 74", 76", 78", 80". An outer layer of fabric 70" wraps around conduit 61 and fabric layers 62", 64", 66", 68" and may be, for example, sewn with a seam 82. Dense fabric layer 62" may be the innermost of fabric layers 62", 64", 66", 68". In addition, the long-term acceptance rate of dense fabric layer 62" may be lower than it is for additional fabric layers 64", 66", 68". During periods of reduced flow, the lower long-term acceptance rate of dense layer 62" may retain effluent in conduit 61 for longer than it would be retained in the absence of the lower long-term acceptance layer. This may keep aerobic module 100 microbially primed during periods of reduced flow. Absent this lower long-term acceptance layer, the semi-permeable layers may become dry during periods of reduced flow, resulting in dormant microbial colonies. While dormant microbes typically become re-activated after effluent is re-introduced, this reactivation can take time, and initially re-introduced effluent may not be fully treated for an initial start-up period. The inclusion of a lower long-term acceptance layer, or region, however can reduce or eliminate this start-up period, providing for complete treatment capability without an extended start-up period. This may be particularly useful in applications where full treatment capacity may be required after extended periods of non-use. This can occur, for example, in vacation homes or after homeowners return from extended absences. A lower long-term acceptance layer may be capable of retaining a measurable effluent level (after flow to the module has ceased) for a period of, for example, one day, three days, seven days or more. A lower long-term acceptance layer may also retain a measurable liquid level for more than 2×, 4× or 10× the standard long-term acceptance time exhibited by other semi-permeable layers in the system. The lower long-term acceptance layer may be positioned nearer the outer surface of the conduit than the other semi-permeable layers and may be the first semi-permeable layer that receives effluent from the conduit.

Figure 8B:
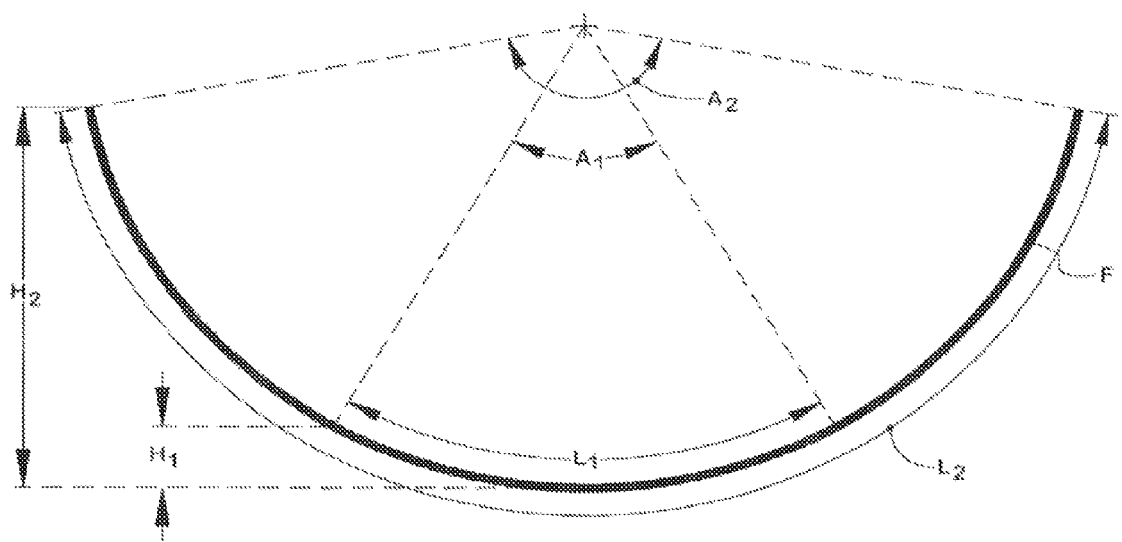
FIG. 8B is a schematic diagram indicating how the different positions in a wrap material are defined.

FIG. 8B shows a layer of fabric F that is shaped like a slice from a tube and has a cross-section that may be approximately U-shaped and/or approximately a portion of a circle. Positions along the fabric may be defined using angles A1, A2, lengths L1, L2, and/or heights H1, H2. For example, the bottom portion may reside in the center of the fabric and have an angle A1, a length L1, and/or a height H1. Similarly, the entire cross-section of the fabric may have an angle A2, a length L2, and/or a height H2. The ratio of the size of the bottom portion to the size of the entire cross-section may be given by A1:A2, L1:L2, and/or H1:H2.

Long term acceptance rates may vary between the lower portion and the upper portion of a module. For instance, the lower portion of a module may exhibit a lower long term acceptance rate than does an upper portion of a module. In one embodiment, one or more fabric layers in an aerobic system may have long-term acceptance rates in the bottom portion of the fabric that are less than or greater than the rate in the top portions of the fabric. For example, the long-term acceptance rate of a fabric layer may be lower over angle A1, length L1, and/or height H1 than over the remainder of the fabric layer. In one embodiment, the ratio of angle A1 to angle A2 may be between about 0.1 and 0.9. In other embodiments, A1:A2 may be between about 0.2 and 0.8 or between about 0.4 and 0.6. Similarly, the ratio of length L1 to length L2 may be between about 0.1 and about 0.9. In other cases, L1:L2 may be between about 0.2 and 0.8 or between about 0.4 and 0.6. In addition, the ratio of height H1 to height H2 may be between about 0.1 and 0.9. In other embodiments, H1:H2 may be between about 0.2 and 0.8 or between about 0.4 and 0.6. Variations in long-term acceptance rate may also be achieved by, for example, providing a fabric layer with a greater thickness in one portion compared to other portions. The fabric may also be treated in one area to reduce flow through the area. For example, a portion of the fabric may be treated with a hydrophobic material such as PTFE. A lower long-term acceptance rate in the bottom portion may help the conduit retain water and therefore the aerobic system may be more likely to retain an area of microbial activity in periods of low input flow rates. Because this layer remains biologically active during periods of reduced use, this active layer can help to seed additional layers that may have become inactive during the low use period. Thus, the whole system may be brought up to full treatment capacity much more quickly than in the absence of the lower long-term acceptance layer. In some embodiments, the semi-permeable layers can help screen out solids and provide for additional surface area on which bacterial colonies can grow. As the wastewater passes through each successive layer it may become more and more purified as a result. Thus, greater wrap angles can provide greater surface area which can retain more solids, provide more bacterial activity, and therefore provide more completely treated effluent and greater quantities of treated effluent. In fact, effluent from the embodiment shown in FIG. 7 may even reach drinking water standards for TOO, TDS and bacterial count.

In another embodiment, fabric layers 62", 64", 66", 68" of aerobic module 100 may have wrap angles that increase with each successive layer away from conduit 61. For example, outermost fabric layer 68" may have a wrap angle between about 270 and 360 degrees, while (dense) layer 62" may have a wrap angle between about 60 and 180 degrees. In alternative embodiments, one or more successive layers may have wrap angles that decrease from the innermost fabric layer to the outermost fabric layer.

As shown in FIGS. 7 and 8, one or more of the fabric layers, such as fabric layers 68' and 68", may have wrap angles greater than about 270 degrees. For example, in FIG. 7, for the wastewater to spill over the top edges of fabric layer 68', the wastewater must nearly completely fill conduit 61. This is in contrast to aerobic module 60 where the wastewater can spill over fabric layer 68 when conduit 61 is only about half full.

It has been the accepted wisdom in the art to use smaller wrap angles for layers in aerobic modules. One reason for using smaller fabric wrap angles is to provide sufficient area, above the fabric layers, for wastewater to spill over the fabric layers and exit the aerobic system in the event of high wastewater input flow rates. Of primary concern is the possibility of septic tank back up during periods of high flow. Back up occurs when the system cannot accept effluent at the rate at which it is entering the system. To avoid the possibility of backup, it has been believed that wrap angles should cover less than half of the conduit to allow water to flow over the layers and out of the conduit through the conduit perforations that reside in the upper half of the conduit cross section. It has also been believed that the permeable spacers may become clogged with solids if significant quantities of untreated effluent were allowed to enter the spacer layers prior to any treatment via a semi-permeable layer. This, in turn, could also cause backup of the system. For these reasons, the wrap angles of the semi-permeable layers, and the spacer layers, are typically less than about 180 degrees.

However, it has recently been discovered that wrap angles can be greater than 180 degrees and still provide for adequate processing of effluent during times of high input. For example, even when the wrap angles are at 270 degrees, or greater, the acceptance rate of the conditioned fabric can be great enough that increased effluent flow can be processed by the fabric without causing the system to back up. Module 90 as shown in FIG. 7 can provide adequate surface area for treatment due to the staggered layer system in which innermost layer 62' has a smaller wrap angle than does next most inner layer 64', which has a smaller wrap angle than does next most inner layer 66' which has a smaller wrap angle than does next most inner layer 68'. Inner layers of greater wrap angles, for example, greater than 180 degrees, greater than 210 degrees or greater than 240 degrees can provide for increased surface area per linear foot that is available for forming a biomat. This increased area of microbial activity can also help to seed additional outer layers.

The embodiment shown in FIG. 7 is compared to the embodiment shown in FIG. 5 to illustrate the amount of increased capacity that may be achieved with a device that utilizes semi-permeable layers of greater wrap angles. The two embodiments use identical perforated conduit having an OD of 11.625 inches. Module sections are typically 10 feet in length and treatment capacities are reported in gallons of effluent per linear foot of conduit per day. A wastewater is considered to be treated if a sufficient amount of contaminants are removed from the wastewater stream. For example, in the case of septic tank effluent, treated water should exhibit CBOD5 less than 25 mg/L (30 day average), TSS less than 30 mg/L (30 day average), pH between 6 and 9, color rating of less than 15 units, non-offensive odor and no detectable oily film/foam. The system of FIG. 5 has been shown to treat up to 2.37 gal/ft/day of septic tank effluent. The system of FIG. 7 however has been shown to be capable of treating up to 4.8 or up to 5.1 gal/ft/day of septic tank effluent. Thus, treatment capacity can be doubled, or more than doubled, using conduit of the same dimension by increasing the wrap angle of the semi-permeable treatment layers and the permeable spacer layers. Experimentation has also shown that issues such as septic tank backup and permeable layer plugging are controlled—the system is capable of handling these greater capacities without backing up. This results in improved levels of treatment and reduced discharge of untreated effluent during periods of high effluent input.

Figure 9A:
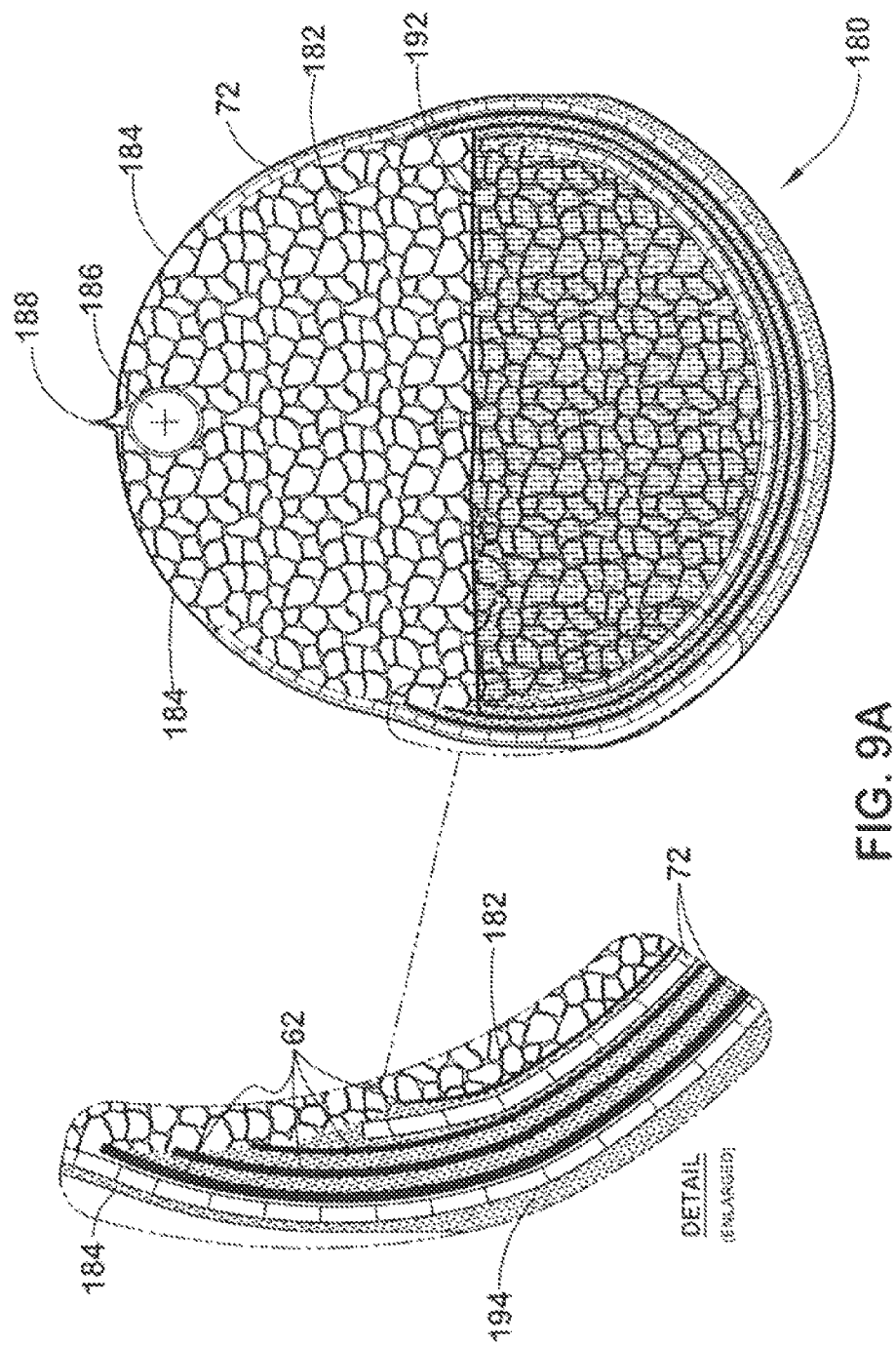
FIGS. 9A-9D are a cross-sectional views of several embodiments of a treatment system having an aerobic digestion module that includes porous media.

Another embodiment of an aerobic module is illustrated in FIG. 9A which shows a cross-sectional view of module 180 including porous media 192. The porous media in this case is shown as crushed stone and forms a substantially circular cross-sectional shape, although this is not necessary. Other porous media may also be used. Wastewater can flow through the media and wastewater flow can be controlled by choosing the porosity of the media bed. The porous media can be retained in position by fabric 184 which is joined at seam 188. Fabric 184 may be tightened or loosened around the media to increase or decrease the packing of the aggregate. The aggregate may be packed more tightly at different points in the module. For instance, the aggregate may be packed more tightly (lower porosity) in the lower portion of the figure compared to the upper portion. This may be achieved by using a finer media (lower porosity) in the lower portion of the module and a coarser media (higher porosity) in the upper portion. In this manner, the flow rate may vary as water level 192 rises. This increasing porosity gradient from bottom to top can provide for improved treatment at low flow levels while allowing for increased flow rates at high flow levels in order to prevent backup. Porosity may also be varied from module to module with flow rates either decreasing or increasing as wastewater passes from one module to the next.

As with other embodiments described herein, the module may be wrapped with layers of semi-permeable plastic fabric and coarse, porous materials. Any of the wrapping designs described herein may also be used with a porous media based module and the module may also be used in conjunction with one or more anaerobic modules as described herein. For instance, as shown in FIG. 9A the module may be wrapped with one or more layers of semi-permeable fabric 162 that may be of varying wrap angles, as shown. Coarse mesh layers 72 and porous random fiber layer 194 may also be included.

Figure 9B:
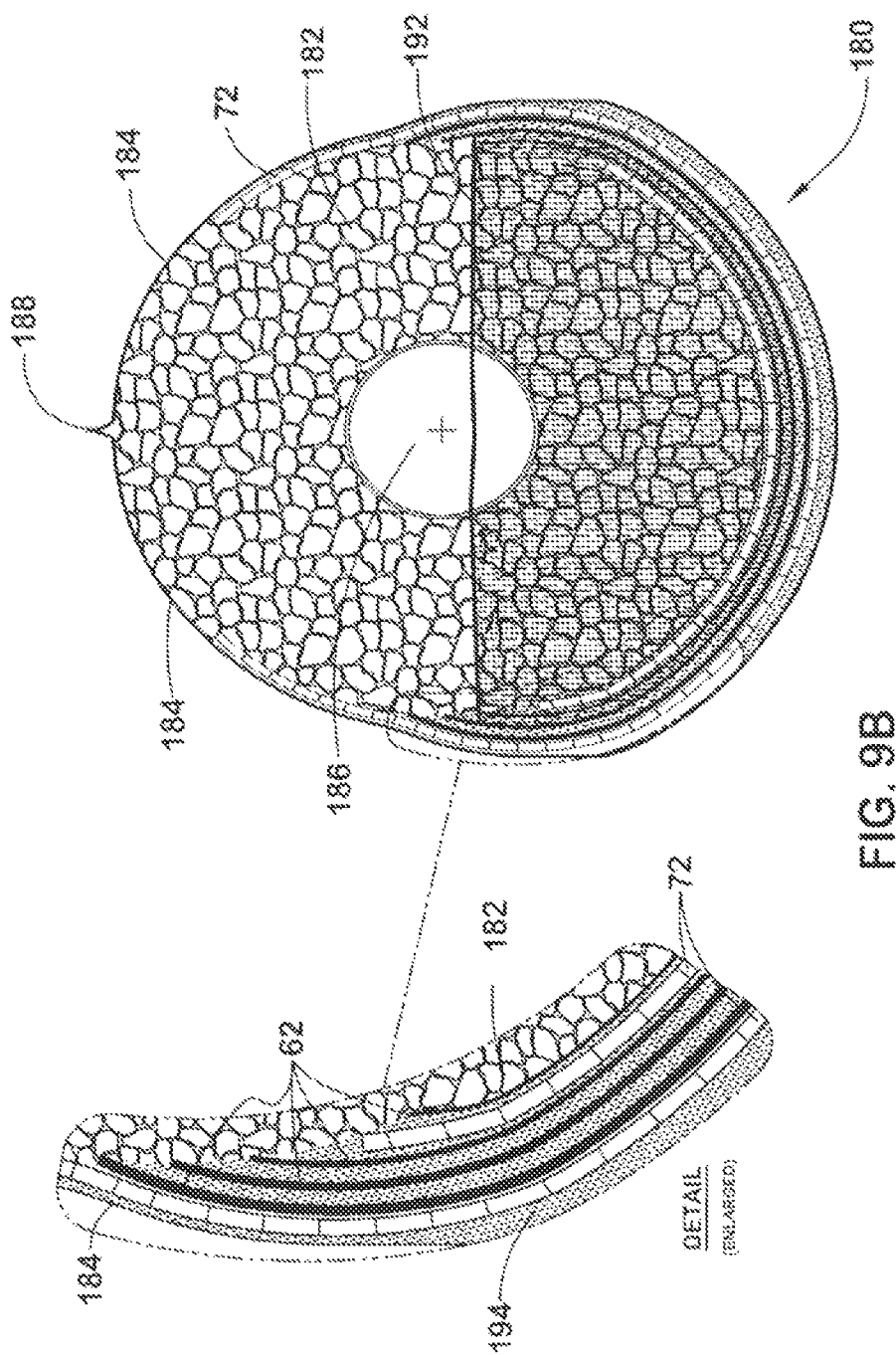
Figure 9C:
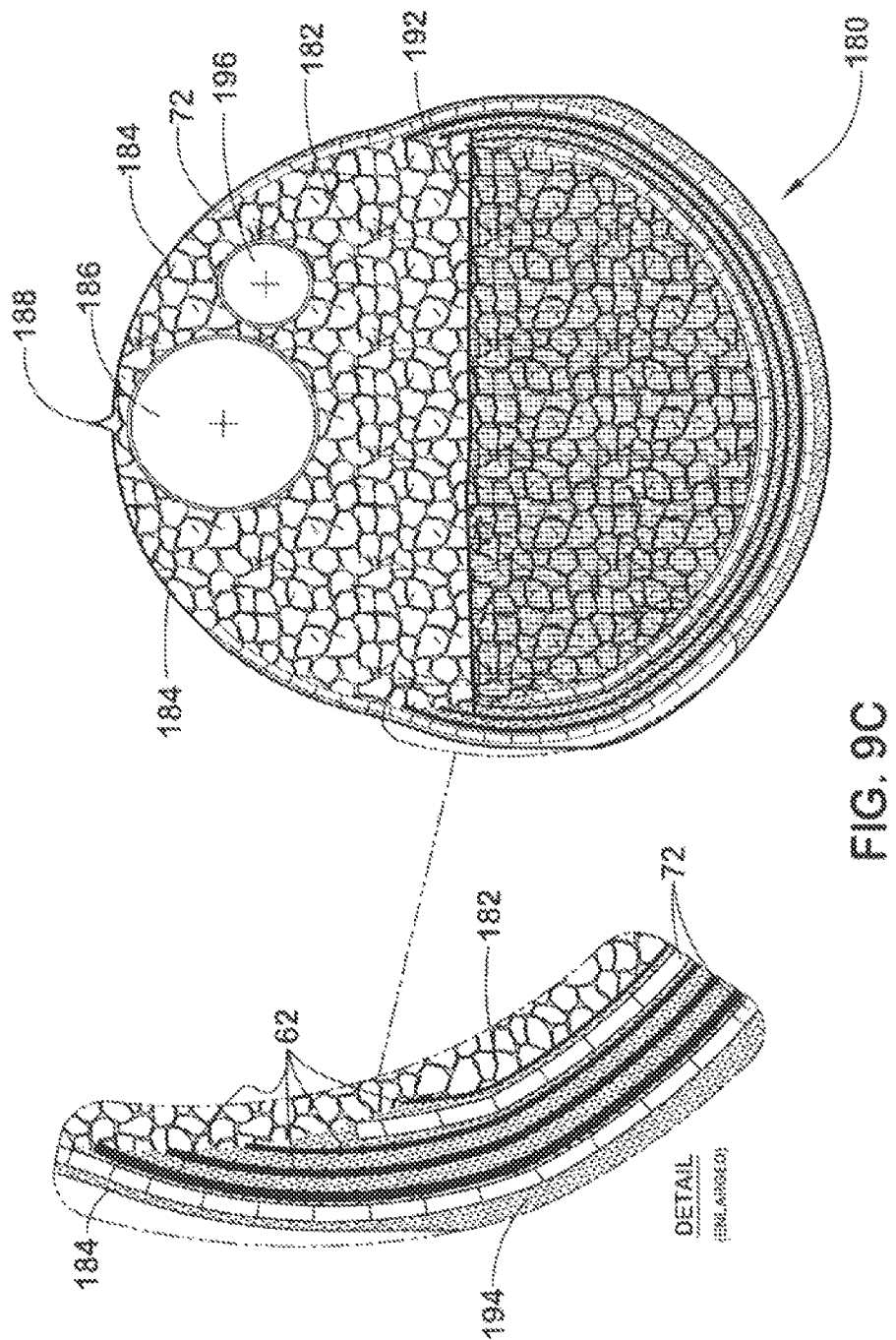

As shown in FIG. 9A, the module may include an internal conduit 186 that may pass axially through the porous media. Internal conduit 186 may be of any diameter and may be placed at any position in the module. Internal conduit 186 may be perforated or unperforated and may be used to transport substances into or out of the module. For instance, internal conduit 186 may provide air or oxygen to the module or may be used to exhaust waste gases. It may also be used to feed wastewater to the system or as a conduit for providing nutrients, bacteria or other materials that may enhance aerobic activity. FIG. 9B provides a cross-sectional view of an embodiment where internal conduit 186 is centrally oriented along the axis of the module. FIG. 9C shows an embodiment including two internal conduits 186 and 196. In this example, internal conduit 186 is a vent pipe while 196 is a supply pipe providing wastewater to the aerobic module. Internal conduits may be fluidly linked to, for example, wastewater sources, external vents, nutrient supplies and oxygen sources.

Figure 9D:
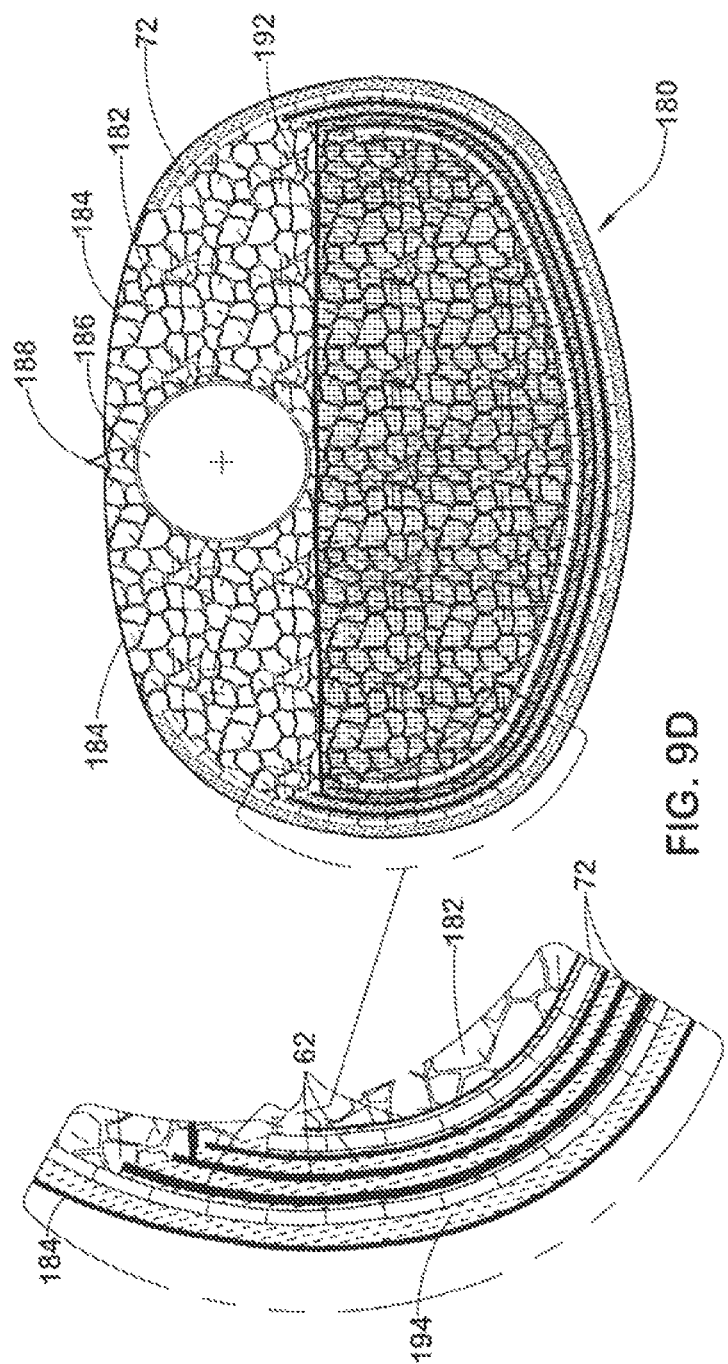

FIG. 9D illustrates a cross-sectional view of an embodiment which is not circular in cross-section but is instead approximately oval. This embodiment may be useful when the system calls for a shallower aerobic module of equivalent capacity. As the module may be manufactured on site, a single aerobic module or any series of modules may differ in cross-section along its length. For instance, a module may be substantially round at one end but substantially oval at the other. The module may also be flexible enough that similar shape changes can be made laterally to avoid obstacles or allow for installation of other equipment.

Figure 10A:
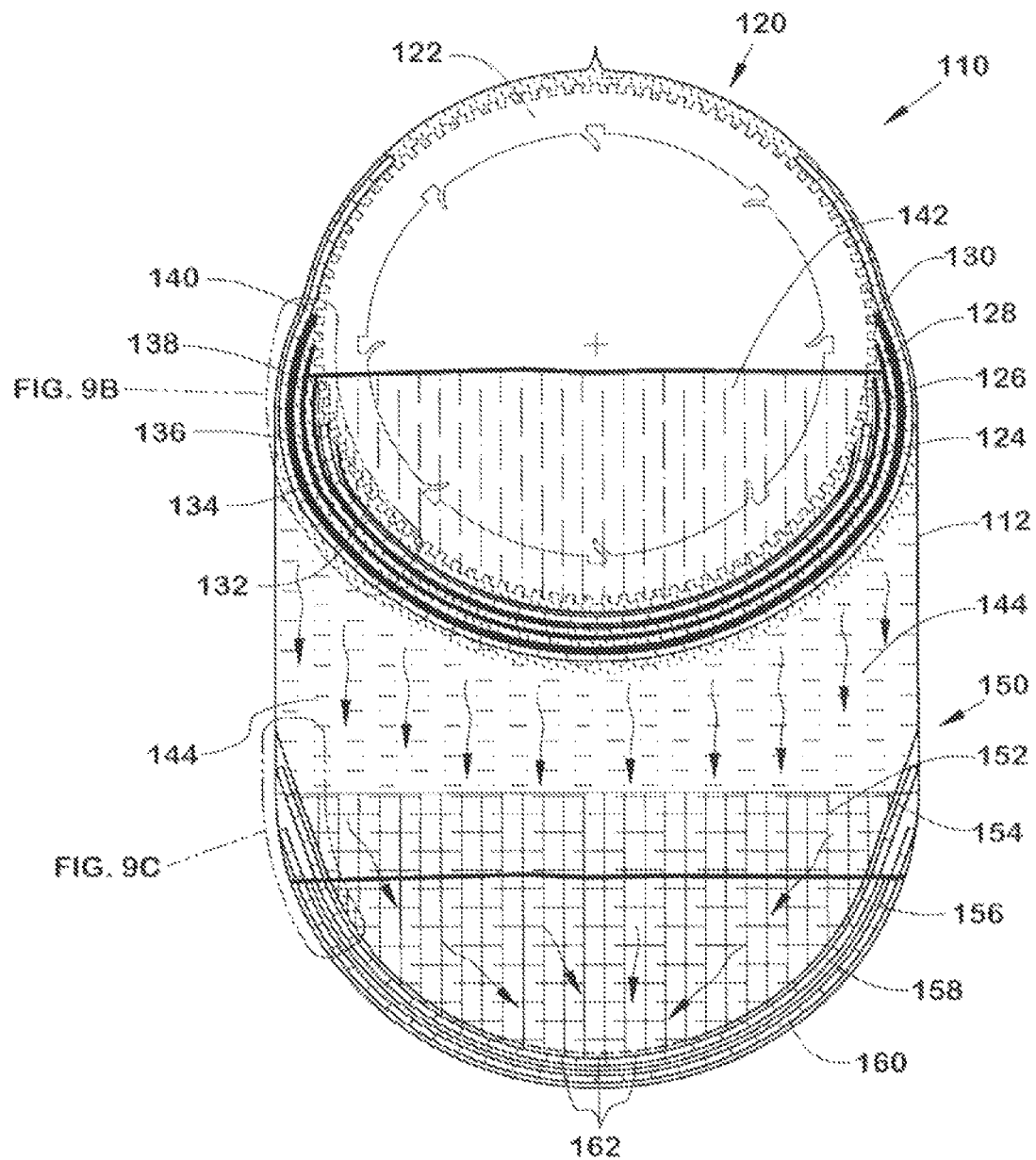
FIG. 10A is a cross-sectional view of one embodiment of a treatment system having an aerobic digestion module and an anaerobic digestion module enclosed within an outer fabric.
Figure 10B:
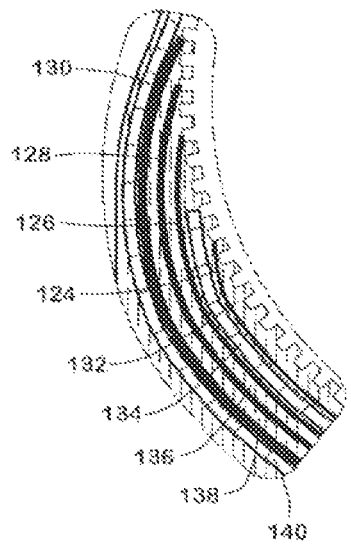
FIG. 10B is an enlarged view of a portion of the embodiment of FIG. 10A.
Figure 10C:
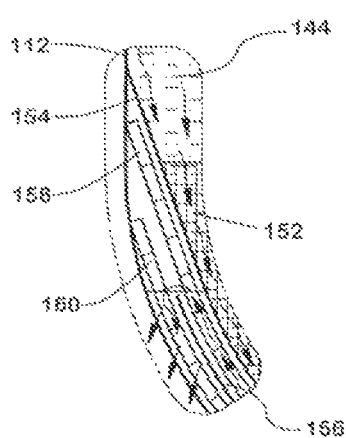
FIG. 10C is an enlarged view of another portion of the embodiment of FIG. 10A.

FIGS. 10A-10C show one embodiment of a treatment system 110 having an outer fabric 112 surrounding an aerobic module 120 and an anaerobic module 150 to form a hybrid aerobic/anaerobic treatment system. Aerobic module 120 may be the same or similar to aerobic modules 10, 40, 60, 90, 100, described above. Aerobic module 120 may include a perforated conduit 122 partially wrapped with layers of semi-permeable material such as fabric 124, 126, 128, 130. Layers of porous spacer material 132, 134, 136, 138, 140 may be positioned adjacent to each layer of fabric 124, 126, 128, 130. This results in alternating layers of semi-permeable material and spacer material.

During operation of aerobic module 120, wastewater 142 is delivered to conduit 122 where contaminants in wastewater 142 are aerobically digested by microbes primarily resident on the semi-permeable layers 124, 126, 128 and 130. Wastewater 142 may permeate through semi-permeable layers 124, 126, 128, 130 and spacer layers 132, 134, 136, 138, 140, which have large amounts of surface area on which bacteria can reside and digest the waste materials. This large surface area can also provide a supply of oxygen from passive and/or active sources. As shown in FIG. 10A, if the height of wastewater 142 reaches the top edges of one of fabric layers 124, 126, 128, 130, wastewater 142 may spill over the top edges and fill the interstitial space in one of the adjacent spacer layers 132, 134, 136, 138 and 140.

Once wastewater 142 has flowed beyond fabric layers 124, 126, 128, 130 and spacer layers 132, 134, 136, 138, 140, in a direction away from conduit 122, wastewater 142 may exit aerobic system 120 and pass through a permeable material 144. Permeable material 144 may be positioned below aerobic module 120 and/or above anaerobic module 150. In other systems, the permeable material may be eliminated and effluent may pass directly from the aerobic module to the anaerobic module. Outer fabric 112 may laterally constrain permeable material 144. Outer fabric 112 may be installed on site or at the production facility. By installing the fabric at the production facility this hybrid system may be shipped ready for installation.

Anaerobic module 150 may include a carbon source 152, one or more impermeable liners 154, 156 and spacer layers 158, 160. Carbon source 152 may be supported by innermost impermeable liner 154. Impermeable liner 154 may be U-shaped in cross section and have perforations 162 in the bottom portion of the U-shape, rendering this portion semi-permeable, to permit the flow of wastewater 142 through fabric liner 154. Once wastewater 142 flows through perforations 162 it may fill the region between impermeable liners 154, 156 occupied by spacer fabric layer 158. When the level of wastewater 142 within spacer fabric layer 158 rises to reach the top edges of outer impermeable liner 156, the liquid may spill over outer impermeable liner 156 where it may reach spacer fabric layer 160. Alternatively, outer impermeable liner 156 may include perforations that allow the wastewater to pass through outer impermeable liner 156 when the wastewater has reached a desired height. Once wastewater 142 has reached spacer fabric layer 160, wastewater 142 may exit anaerobic module 150 and treatment system 110 by passing through outer fabric 112. The perforations and layers may be designed to retain effluent for a period that is adequate to convert $NO_x$ to nitrogen gas while maintaining enough flow-through to treat a majority of the fluid reaching the anaerobic system.

Referring to the dimensions provided in FIG. 8B, perforations 162 in the bottom portion of impermeable liner 154 may extend over an angle A1, a length L1, and/or a height H1 while the entire cross-section of impermeable liner 154 may have an angle A2, a length L2, and/or a height H2. In one embodiment, the ratio of angle A1 to angle A2 may be between about 0.1 and 0.9. In other embodiments, A1:A2 may be between about 0.2 and 0.8 or between about 0.4 and 0.6. Similarly, the ratio of length L1 to length L2 may be between about 0.1 and about 0.9. In other cases, L1:L2 may be between about 0.2 and 0.8 or between about 0.4 and 0.6. In addition, the ratio of height H1 to height H2 may be between about 0.1 and 0.9. In other embodiments, H1:H2 may be between about 0.2 and 0.8 or between about 0.4 and 0.6.

Figure 11:
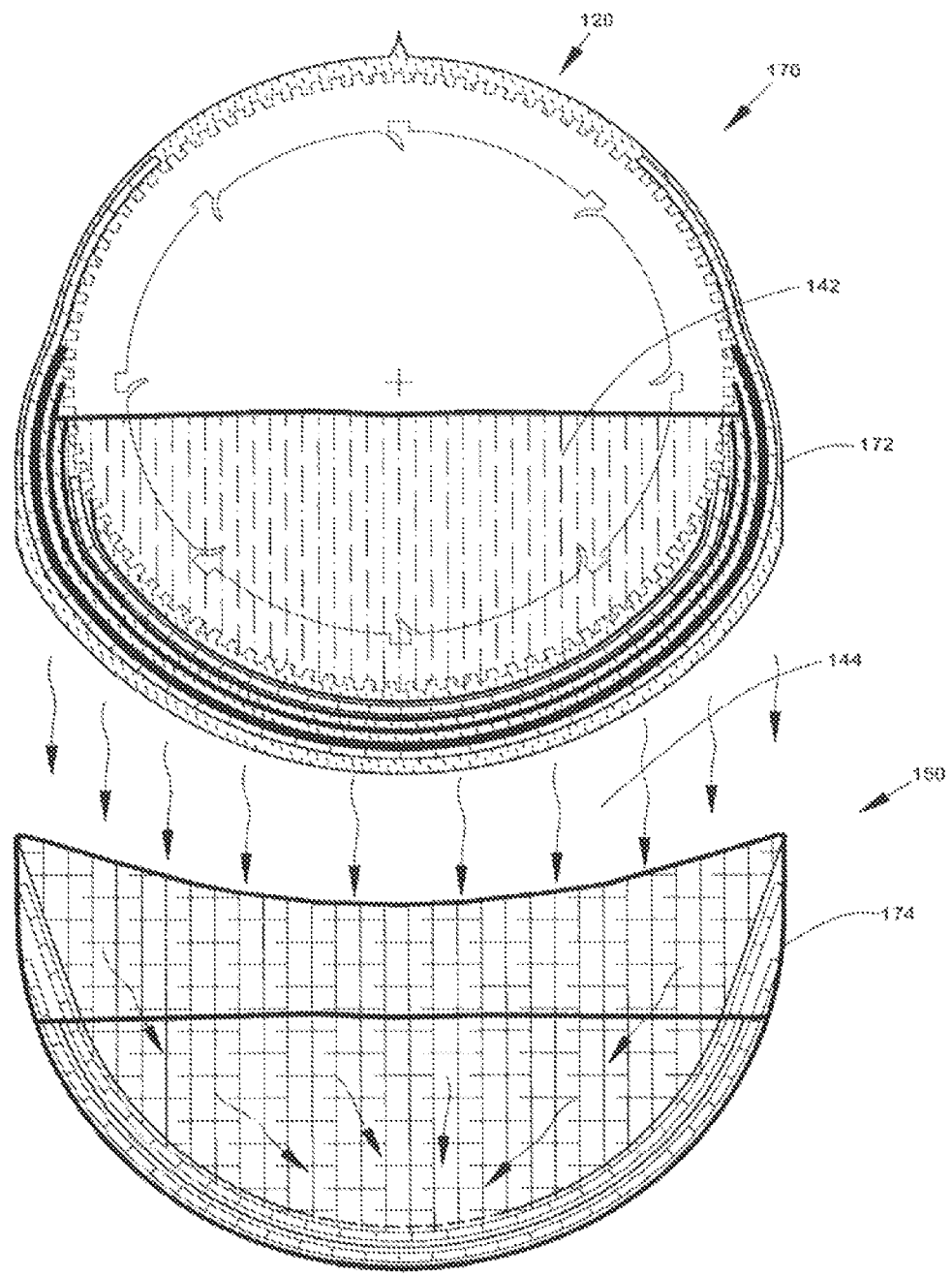
FIG. 11 is a cross-sectional view of one embodiment of a treatment system having an aerobic digestion module and an anaerobic digestion module.

FIG. 11 shows another embodiment of a treatment system 170 in which aerobic module 120 and anaerobic module 150 are not enclosed within a common outer fabric. Instead, aerobic system 120 is enclosed within an outer fabric 172 and anaerobic module 150 is enclosed within a separate outer fabric 174. As shown, aerobic system 120 may be placed above anaerobic system 150, and permeable material 144 may be placed between them. Permeable material 144 may facilitate the flow of wastewater 142, by gravity, from aerobic system 120 down to anaerobic system 150. Additional anaerobic systems may be added to the system as shown. For example, anaerobic modules may be placed below or next to the module shown. Multiple anaerobic modules may be in contact with each other or may be spaced from each other by, for example, more than 1 inch, more than 3 inches or more than 6 inches apart. If spaced apart, the space between the modules may be filled with a permeable material.

In embodiments that include one or more anaerobic modules a conduit may be provided in the vicinity of the modules that can be used to provide oxygen or other gases to the system. By intermittently supplying oxygen to the system, the system can be cycled through aerobic and anaerobic cycles which can effectively kill pathogens that may be present in or may be introduced to the system. The system may be exposed to regular cycles of aerobic/anaerobic/aerobic/anaerobic treatment that can be performed either manually or can be automated. Appropriate levels of oxygen and appropriate time intervals can be determined via experimentation to see when pathogen populations are most effectively reduced.

In another aspect, a device is provided for venting gases, such as nitrogen gas, produced during anaerobic digestion within anaerobic module 150. The ventilation device may capture these gases before they can reach the aerobic module and interfere with aerobic digestion processes. Specifically, it has been discovered that the proximity of the anaerobic module to the aerobic module can lead to inhibition of aerobic digestion and, for example, prevent TKN and/or $NH_3$ from being successfully converted into $NO_2$ and/or $NO_3$. It is believed that the presence of nitrogen gas is the cause of this reduced aerobic activity.

Figure 12A:
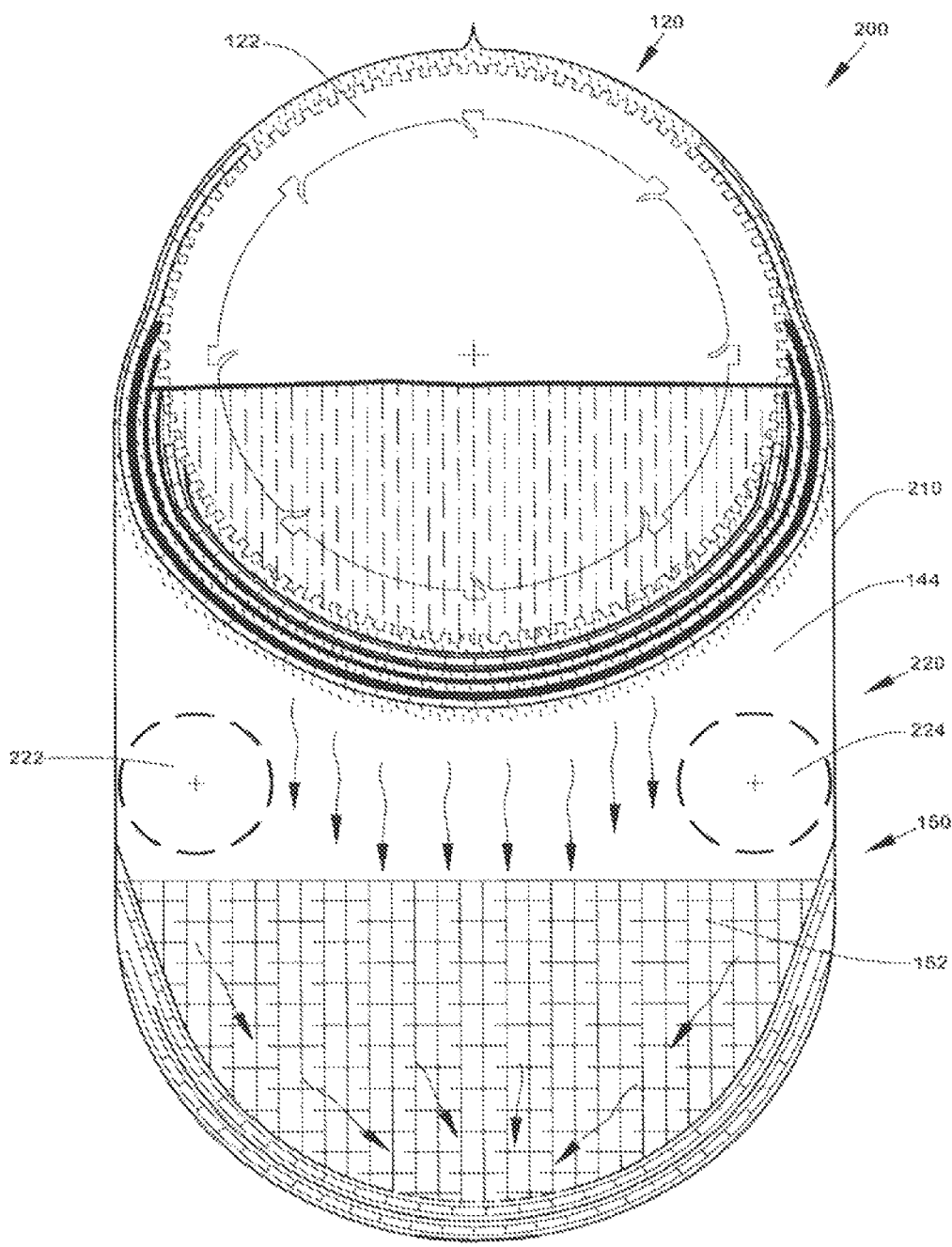
FIG. 12A is a cross-sectional view of one embodiment of a treatment system having an aerobic digestion module, an anaerobic digestion module, and a ventilation system enclosed within an outer fabric.
Figure 15:
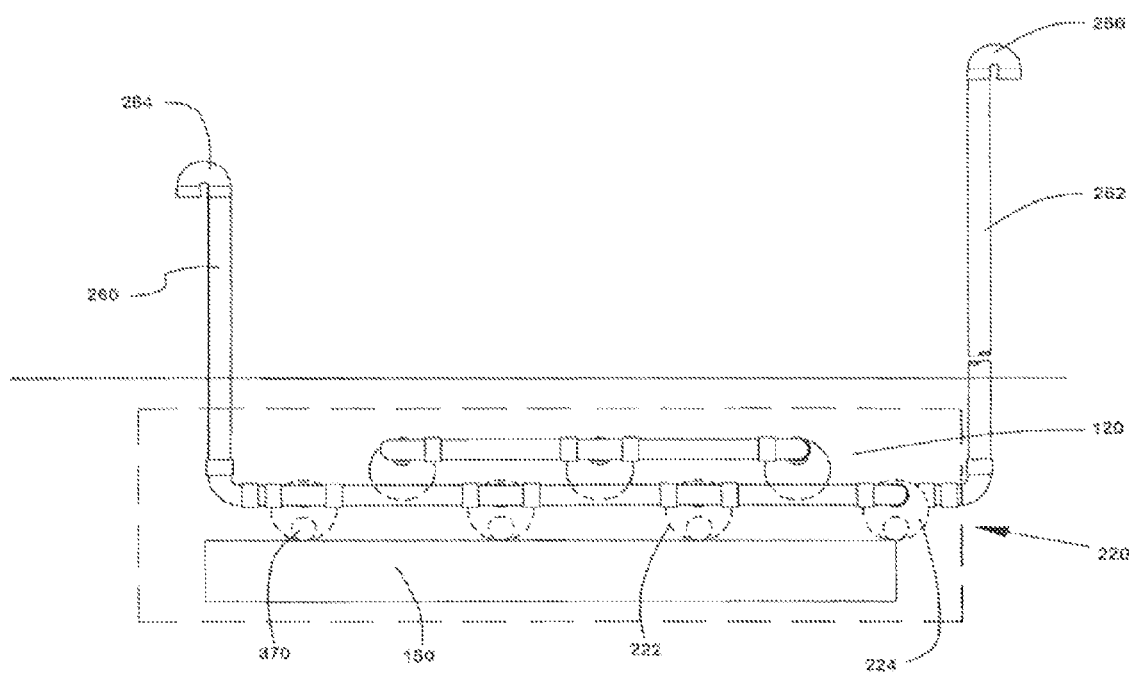
FIG. 15 is a side view of one embodiment of a treatment system having a ventilation system with exterior pipes.

FIGS. 12A and 15 show an embodiment of treatment system 200 that includes an outer fabric 210 wrapped around aerobic module 120, permeable material 144, anaerobic module 150, and a ventilation system 220. The ventilation system can serve to shunt the nitrogen away from the aerobic module. Ventilation system 220 may include perforated pipes 222, 224 that run approximately parallel with conduit 122 and are positioned above and/or in carbon source 152. Perforated pipes 222 and 224 may include perforations to allow gases to reach the inside of perforated pipes 222, 224 from the exterior. Pipes 222 and 224 may be rigid or flexible. The ventilation system may be of any size appropriate for removing nitrogen from the system and can be positioned anywhere that allows the system to direct the nitrogen gas, or any other gases produced in the anaerobic process, away from the aerobic module 120.

Figure 12B:
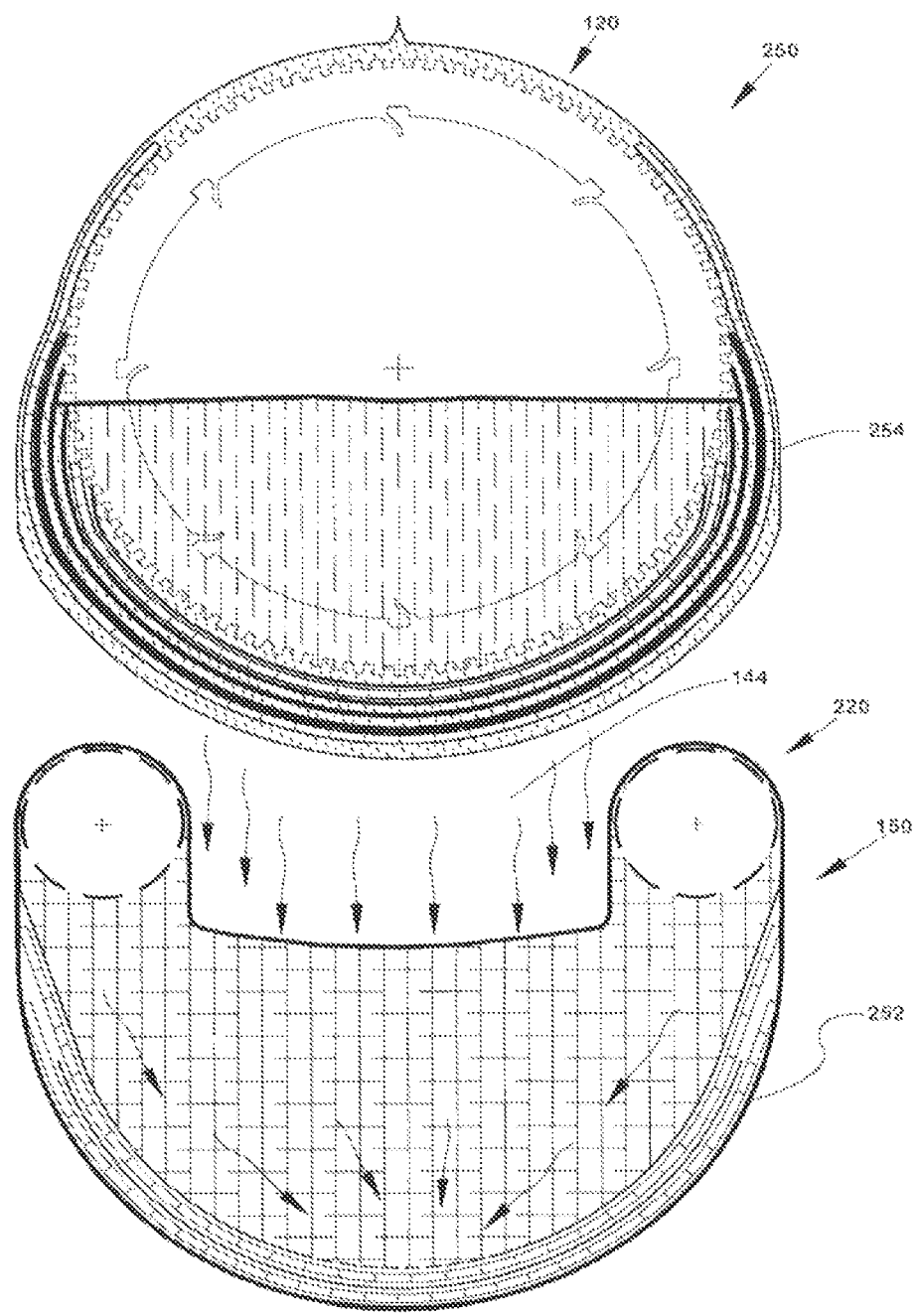
FIG. 12B is a cross-sectional view of one embodiment of a treatment system having an aerobic digestion system, an anaerobic digestion system, and a ventilation system.

FIG. 12B shows an embodiment of a treatment system 250 that includes fabric 252 enclosing anaerobic module 150 and ventilation system 220 and a separate outer fabric 254 enclosing aerobic module 120. Permeable material 144 may be positioned below aerobic module 120 and above anaerobic module 150.

FIG. 13 provides a cross sectional view of a hybrid system that includes one, two, three or more aerobic modules and one, two, three or more anaerobic modules. Aerobic modules 250, 252 etc. may be perforated corrugated pipe and may have a diameter of about 12 inches. Aerobic modules 250 and 252 may be installed side-by-side and may be in fluid communication with each other. For example, water may flow from module 250 to 252 in series through a connector. Alternatively, the modules may be fed from a common wastewater source in a parallel arrangement. Positioned underneath aerobic modules 250 and 252 are anaerobic module 350 and, optionally, anaerobic module 352. Additional anaerobic modules may also be added and may be positioned below module 352. Anaerobic module 350 may include carbon source 372. For example, carbon source 372 may be a stack of sheets, such as fiberboard sheets. The stack of sheets may be water permeable and need not include an outer container or housing and need not be isolated from the ground or groundwater. There may be more than 5, 10, 50 or 100 individual sheets stacked together. The stack of sheets may be positioned directly in the ground and may be underneath one or more aerobic modules 250 and 252 so that partially treated water exiting the aerobic modules can advance to anaerobic treatment via gravity feed. Permeable material 144 can be used to separate modules from each other. Additional anaerobic module 352 may be positioned below anaerobic module 350 and may be smaller, larger or of similar size. The carbon material of second anaerobic module 352 may be the same or different from that of anaerobic module 350. As shown, module 352 is wider than is module 350 so that the lower positioned module can capture most or all of the effluent that exits module 350.

When operational, wastewater enters aerobic modules 250 and 252 where the water is treated aerobically and where nitrogen containing compounds are converted to $NO_x$. The resulting effluent passes through the semi-permeable membrane(s) of the aerobic module and percolates through one layer of permeable material 144. The water enters anaerobic module 350 and saturates carbon source 372. In carbon source 372 the $NO_x$ is subjected to anaerobic conditions and at least a portion of the $NO_x$ is converted to nitrogen gas. The nitrogen gas may be shunted from the system via ventilation system 360. After passing through module 350 water may percolate through an additional layer of permeable material 144 after which it enters second anaerobic module 352. Anaerobic module 352 may contain an additional carbon source and may further treat any $NO_x$ that is left in the effluent. Nitrogen gas may be diverted by ventilation system 362 and treated water may percolate out of anaerobic module 352 containing a lower level of nitrogen than when it entered the module. Additional layers may also be used to further treat the wastewater. Recharge tube 370 may be positioned inside of vent pipe 360 and can be used to provide substances such as carbon, sulfur, nutrients or microorganisms to the carbon source.

Figure 14B:
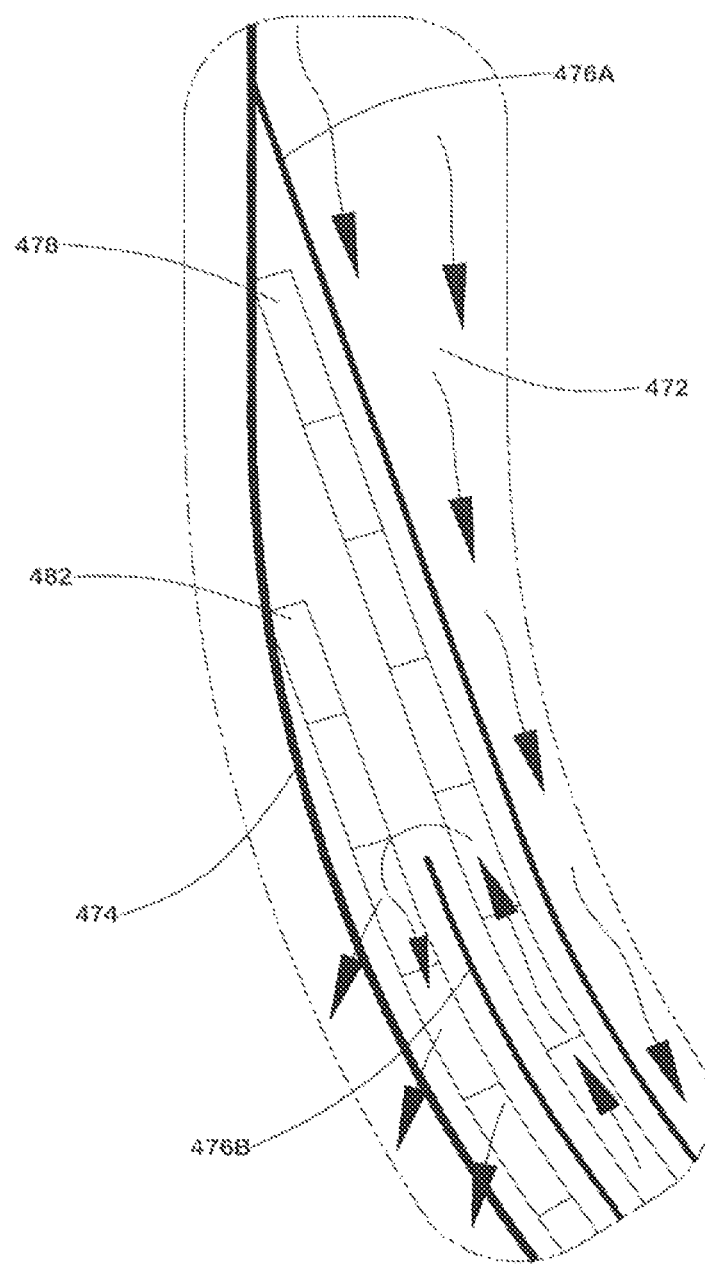
FIG. 14B is an enlarged cross-sectional view of a portion of the anaerobic module of the embodiment shown in FIG. 14A.

The system illustrated in FIG. 14A is similar to that shown in FIG. 13 in that multiple aerobic and multiple anaerobic modules can be employed. The carbon source 472 however may be retained in container 470 and therefore can be a loose material, layered material or any other suitable carbon source. Loose material may include, for example, vegetation and charcoal. Carbon source 472 may be covered by a permeable material, such as permeable geotextile fabric 474 which can surround the carbon source and help to retain carbon source 472 in position. Container 470 may include upwardly sloping walls and a floor designed to retain liquid. Container 470 may include one or more impermeable liners 476a and 476b that may be separated by spacer layer 478 which can allow for the free flow of liquid between impermeable layers. The innermost impermeable liner 476a may include perforations in a portion of the liner that allow for the passage of liquid through the impermeable layer 476a. For example, the lower, horizontal portion of liner 476a may include perforations while the upper vertical portions may be free of perforations and thus remain impermeable. In this manner, water may pass through impermeable liner 476a and flow along spacer layer 478 while being retained by impermeable layer 476b. Under head pressure provided by water level 490, the water flows upwardly through spacer layer 478 (see FIG. 14B) while being trapped between impermeable liners 476a and 476b. Only when the water reaches the upper edge 482 of impermeable liner 476b is it free to spill over and exit the module. In this way, water is retained in an anaerobic environment for a period of time adequate to promote anaerobic treatment of $NO_x$ that may be in the wastewater stream. Additional liners similar to 476a and 476b may be used to increase the path length of water flow and thus increase the residence time of water in the anaerobic module. Anaerobic module 452 may be of similar design although, as shown, may be of different dimensions. Anaerobic module 452 may also be designed to retain water for a shorter or longer duration than anaerobic module 450. After exiting module 452, water may be passed to an additional treatment module, may be diverted to an alternative use such as irrigation, or may be dispersed to the ground.

As shown in FIG. 15, perforated pipes 222, 224 of ventilation system 220 may be connected to one or more exterior pipes 260, 262 that extend above ground and into the atmosphere. These pipes can serve as entrance and exit for introducing air and removing nitrogen and other gases. Exterior pipes 260, 262 may have curved top portions 264, 266. In addition, to promote the passive flow of gases through ventilation system 220, one of exterior pipes 260, 262 may be taller than the other exterior pipe 260, 262. For example, exterior pipe 262 may be about 10 inches taller than exterior pipe 260. Ventilation system 220 may also include a blower to force or pull gases through ventilation system 220. A vacuum source may also be used to move gases through the ventilation system by reducing the pressure in the ventilation system.

During operation of treatment systems 200, 250, wastewater may be aerobically digested in aerobic module 120 and anaerobically digested in anaerobic module 150, and gases produced during anaerobic digestion, such as nitrogen gas, may be vented to the atmosphere by ventilation system 220. The gases may, for example, bubble up from and/or through carbon source 152 and enter perforated pipes 222, 224. The gases may then flow through perforated pipes 222, 224 and into exterior pipes 260, 262, which may discharge the gases to the atmosphere. In this manner, nitrogen gas is diverted from the aerobic module allowing the aerobic system to function properly. A slight negative pressure in the ventilation system can help draw nitrogen into the ventilation system and away from the aerobic module 120.

In another embodiment, ventilation system 220 may be used to add carbon to carbon source 152. Over time, anaerobic digestion within carbon source 152 may result in the breakdown and/or loss of carbon materials within carbon source 152. With previous designs, carbon materials could only be added to carbon source 152 by digging into the ground, exposing the carbon source, and adding new carbon materials. In one set of embodiments, carbon materials, in the form of liquids, gases and/or solids, may be added to carbon source 152 by pouring them into pipes 260, 262. The carbon materials may then flow through the perforations in perforated pipes 222, 224 to be deposited on carbon source 152. Sulfur based materials may also be added in this manner by providing sulfur in solution form, for example, into vent pipes 260,262. By using ventilation system 220 to recharge carbon source 152, the expense of digging up the treatment system is avoided and the associated risk of damage to the treatment system is minimized.

In another embodiment, ventilation system 220 may be used to add beneficial microbes such as bacteria to the treatment system. Specifically, liquid and/or solid materials containing the bacteria may be introduced into perforated pipes 222, 224. The liquid and/or solid materials may then flow through the perforations in pipes 222, 224 to be deposited into the treatment system. By using ventilation system 220 in this manner, the bacteria necessary for digestion may be introduced into the treatment system without having to dig up the treatment system.

Figure 16:
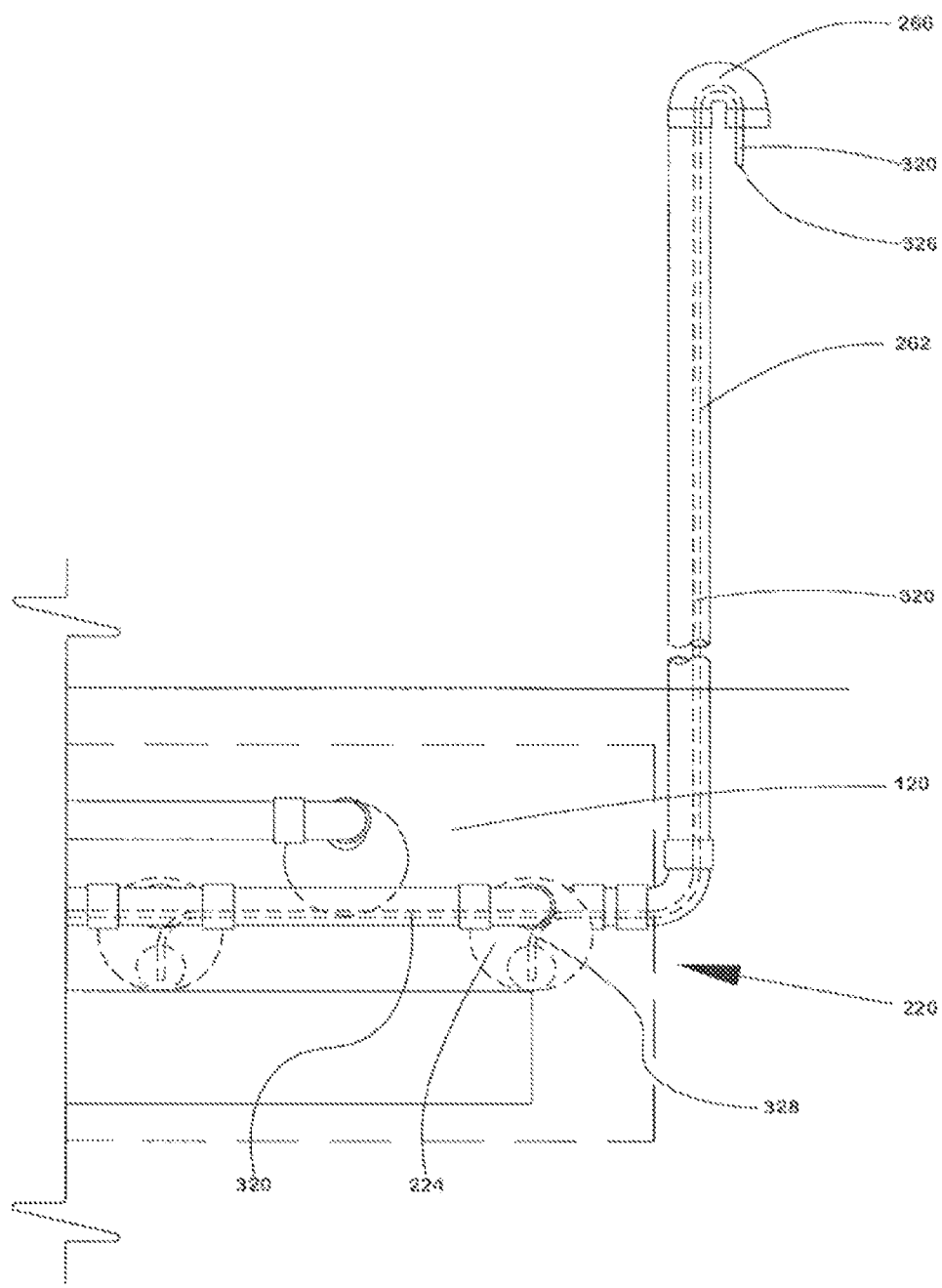
FIG. 16 is a side view of an embodiment utilizing ventilation pipes containing internal tubing for delivering materials to the system.

In another embodiment, the vent system may include a second conduit for delivering additives such as carbon, sulfur and microbes. As illustrated in FIG. 16 a second conduit, in this case tube 320, may run from the surface to the carbon source through the venting system. Additives may be provided via the proximal end 326 of tube 320 which may be above ground and easily accessible. The distal end 328 may be branched and may lead directly to one or more carbon sources 150. In this manner, additives may be directly delivered to the target by adding them to the proximal end 326 of tube 320. The additives may be provided manually or may be pumped into the system and can be added on a continuous basis if desired. Materials may be added via tube 320 without interfering with the venting process and without distributing additives to non-target areas, such as those permeable regions between aerobic and anaerobic modules.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A system for treating wastewater, the system comprising:
    a conduit positioned substantially horizontally, the conduit including a plurality of apertures passing through the wall of the conduit;
    a semi-permeable layer contacting a lower portion of an external surface of the conduit and covering at least one of the plurality of apertures;
    a carbon source positioned underneath the conduit to receive liquid passing through the first semi-permeable layer; and
    an outer fabric layer surrounding the conduit and the carbon source.

2. The system of claim 1 further comprising a plurality of semi-permeable layers wherein at least two of the semi-permeable layers are separated by a permeable spacer layer and a wrap angle of a second semi-permeable layer is greater than a wrap angle of the first semi-permeable layer.

3. The system of claim 1 comprising a water permeable material positioned below the conduit and above the carbon source.

4. The system of claim 1, wherein the carbon source is substantially isolated from oxygen.

5. The system of claim 1, wherein the carbon source comprises a solid carbon source.

6. The system of claim 2, wherein at least a portion the first semi-permeable layer has a lower long-term acceptance rate than does the second semi-permeable layer.

7. The system of claim 1 comprising a second liner positioned between the carbon source and the liner, the second liner having a lower portion that is permeable to water and an upper portion that is impermeable to water.

8. The system of claim 1, wherein the conduit is a pressurized conduit.

9. The system of claim 1, wherein the system is positioned in the ground.

10. The system of claim 1, wherein the conduit is positioned within 5 degrees of horizontal.

11. The system of claim 1 comprising a liner supporting the carbon source, the liner forming a retention zone containing the carbon source.

12. A device for aerobically treating wastewater, the device comprising:
    a conduit having a wall and including a plurality of apertures passing through the wall;

a first material layer wrapping a lower portion of the conduit, the first material layer having a first wrap angle measured around the circumference of the conduit;

a second material layer wrapping at least a portion of the conduit, the second material layer having a wrap angle greater than 180 degrees and less than 360 degrees around the circumference of the conduit; and an outer fabric layer surrounding the conduit, the first material layer, and the second material layer.

13. The device of claim 12, wherein the first material layer has a long-term acceptance rate that is slower than the acceptance rate of the second material layer.

14. The device of claim 12 further comprising a permeable spacer layer positioned between the first material layer and the second material layer.

15. The device of claim 12, wherein at least one of the first material layer and the second material layer comprises a fabric.

16. The device of claim 12, wherein the first material layer and the second material layer are semi-permeable.

17. A system for treating wastewater comprising the device of claim 12 and an anaerobic module comprising a carbon source positioned downstream of the device.

18. A method of treating wastewater comprising:
flowing the wastewater through the interior of a conduit having a wall including apertures therethrough;
passing the wastewater through a layer at least partially covering the external surface of the conduit;
converting ammonia and/or TKN in the wastewater to $NO_x$;
passing the wastewater to a carbon source;
converting at least a portion of the $NO_x$ to nitrogen gas within the carbon source; and
directing the nitrogen gas away from the conduit.

19. The method of claim 18 further comprising recharging the carbon source by providing carbon through a venting pipe and into the carbon source.

20. The method of claim 18, comprising recharging the carbon source by providing carbon to the carbon source via a tube positioned inside a venting pipe.

\* \* \* \* \*